(12) United States Patent
Akita

(10) Patent No.: US 9,735,810 B2
(45) Date of Patent: Aug. 15, 2017

(54) TRANSMITTING DEVICE, RECEIVING DEVICE AND TRANSMITTING/RECEIVING SYSTEM

(75) Inventor: Hironobu Akita, Chiyoda-ku (JP)

(73) Assignee: THINE ELECTRONICS, INC., Tokyo (JP)

( * ) Notice: Subject to any disclaimer, the term of this patent is extended or adjusted under 35 U.S.C. 154(b) by 639 days.

(21) Appl. No.: 13/519,804

(22) PCT Filed: Jun. 2, 2011

(86) PCT No.: PCT/JP2011/062717
§ 371 (c)(1),
(2), (4) Date: Aug. 10, 2012

(87) PCT Pub. No.: WO2012/017732
PCT Pub. Date: Feb. 9, 2012

(65) Prior Publication Data
US 2012/0321002 A1 Dec. 20, 2012

(30) Foreign Application Priority Data
Aug. 3, 2010 (JP) .................................. 2010-174404

(51) Int. Cl.
*H04L 7/04* (2006.01)
*H04B 1/04* (2006.01)
(Continued)

(52) U.S. Cl.
CPC ......... *H04B 1/0475* (2013.01); *H04L 7/0008* (2013.01); *H04L 7/0337* (2013.01); *H04B 15/04* (2013.01)

(58) Field of Classification Search
CPC ........ H04B 2215/064; H04B 2215/065; H04B 2215/067; H04B 15/02; H04B 15/00;
(Continued)

(56) References Cited

U.S. PATENT DOCUMENTS 7,043,202 B2 * 5/2006 Ozawa et al. .................. 455/23
7,541,853 B2 6/2009 Nakadaira
(Continued)

FOREIGN PATENT DOCUMENTS

CN 101207452 A 6/2008
CN 101395840 A 3/2009
(Continued)

OTHER PUBLICATIONS

Office Action issued by Japanese Patent Office in Japanese Patent Application No. 2010-174404 dated Oct. 15, 2013.
(Continued)

*Primary Examiner* — Michelle M Koeth
(74) *Attorney, Agent, or Firm* — Sughrue Mion, PLLC

(57) ABSTRACT

A transmitting device has a transmission data generating part and an output buffer part. The transmission data generating part transmits a data and a clock, which are to be transmitted to a receiving device, and outputs them to the output buffer part. The output buffer part includes a data transmitting part and a clock transmitting part. The clock transmitting part generates and transmits a clock intermittently phase-shifted. The data transmitting part transmits the data in sync with the clock transmitted from the clock transmitting part.

14 Claims, 25 Drawing Sheets

(51) Int. Cl.
*H04L 7/033* (2006.01)
*H04L 7/00* (2006.01)
*H04B 15/02* (2006.01)
*H04B 15/04* (2006.01)

(58) Field of Classification Search
CPC ..... H04B 1/0475; H04B 15/04; H04L 7/0087; H04L 7/00; H04L 7/0331; H04L 49/30; H04L 7/0008; H04L 7/0337; H04N 5/3577; H04N 5/0736; H04W 56/0035; H03B 1/04; H03B 23/00; H03B 2200/0088; H03M 1/0836; G06F 1/08; G06F 13/1668; G06F 13/1673; G06F 13/1689; G06F 9/30072; G01R 31/31709; G01R 31/31726
USPC ........ 375/376, 373, 371, 354, 359; 327/156, 327/155, 141, 100, 292, 291; 345/99, 98, 345/87, 84, 55, 30; 713/503, 500, 600; 348/312, 311, 294, 207.99; 710/61, 58, 710/1, 53, 52
See application file for complete search history.

(56) References Cited

U.S. PATENT DOCUMENTS

| | | | |
|---|---|---|---|
| 2004/0136440 | A1 | 7/2004 | Miyata et al. |
| 2007/0019773 | A1* | 1/2007 | Zhou ............................ 375/373 |
| 2009/0274218 | A1* | 11/2009 | Lavelle et al. ........... 375/240.25 |

FOREIGN PATENT DOCUMENTS

| | | | |
|---|---|---|---|
| CN | 101640524 | A | 2/2010 |
| CN | 101729237 | A | 6/2010 |
| JP | 62-063327 | A | 3/1987 |
| JP | 62-274915 | A | 11/1987 |
| JP | 02-288435 | A | 11/1990 |
| JP | 05-152908 | A | 6/1993 |
| JP | 07-288516 | A | 10/1995 |
| JP | 2000-295108 | A | 10/2000 |
| JP | 2004-129198 | A | 4/2004 |
| JP | 2004-207846 | A | 7/2004 |
| JP | 2004-208037 | A | 7/2004 |
| JP | 2004-208193 | A | 7/2004 |
| JP | 2004206696 | A | 7/2004 |
| JP | 2004-328280 | A | 11/2004 |
| JP | 2005-020083 | A | 1/2005 |
| JP | 2006-217539 | A | 8/2006 |
| JP | 2007-006121 | A | 1/2007 |
| JP | 2007-158466 | A | 6/2007 |
| JP | 2007-208705 | A | 8/2007 |
| JP | 2008-022345 | A | 1/2008 |
| JP | 2009-089407 | A | 4/2009 |
| JP | 2010-78156 | A | 8/2010 |
| KR | 10-0198219 | | 2/1999 |
| KR | 950071089 | | 2/1999 |
| KR | 10-0179207 | B1 | 5/1999 |
| KR | 10-0179213 | B1 | 5/1999 |
| TW | I287913 | B | 10/2007 |
| WO | 2008/029554 | A1 | 3/2008 |

OTHER PUBLICATIONS

Office Action issued by the Korean Patent Office in Korean Application No. 10-2012-7011163 dated May 7, 2013.
International Preliminary Report on Patentability in International Application No. PCT/JP2011/062717 dated Mar. 21, 2013.
International Search Report of PCT/JP2011/062717 dated Jul. 19, 2011.
Communication dated Nov. 3, 2014, issued by the State Intellectual Property Office of the People's Republic of China in counterpart Application No. 201180005194.9.
Notice of Allowance KR Patent Application No. 10-2012-7011163; Sep. 2, 2014.
Communication dated Apr. 18, 2016 from Taiwanese Intellectual Property Office in counterpart Application No. 100123671.
Communication dated May 12, 2015 from the Japanese Patent Office in Counterpart Application No. 2010-174404.

\* cited by examiner

Fig.17
(a)
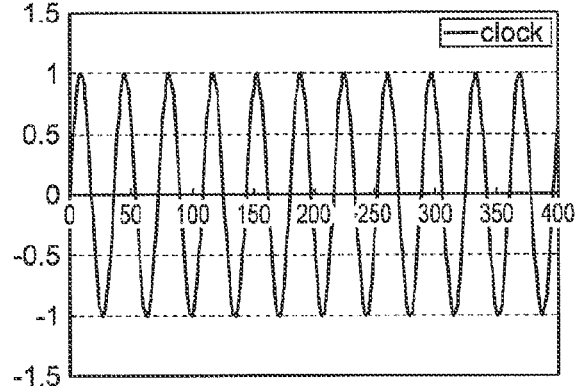
(b)
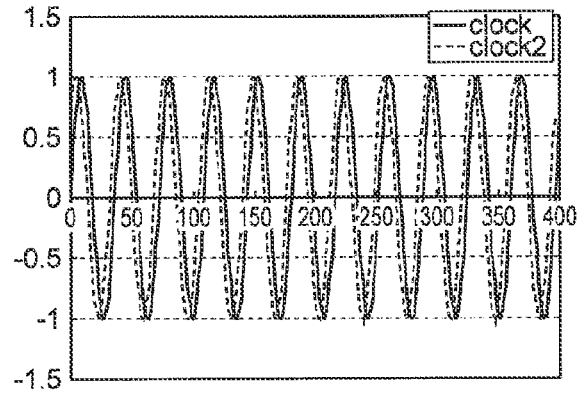
(c)
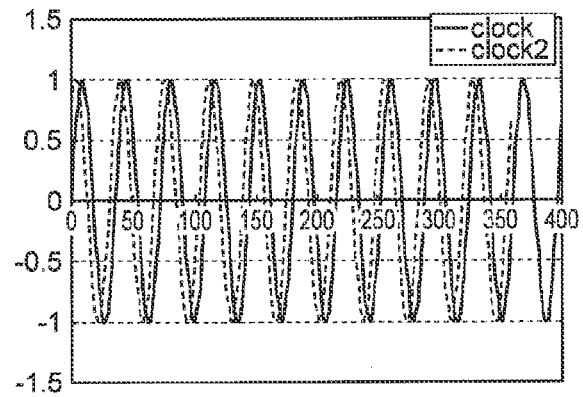

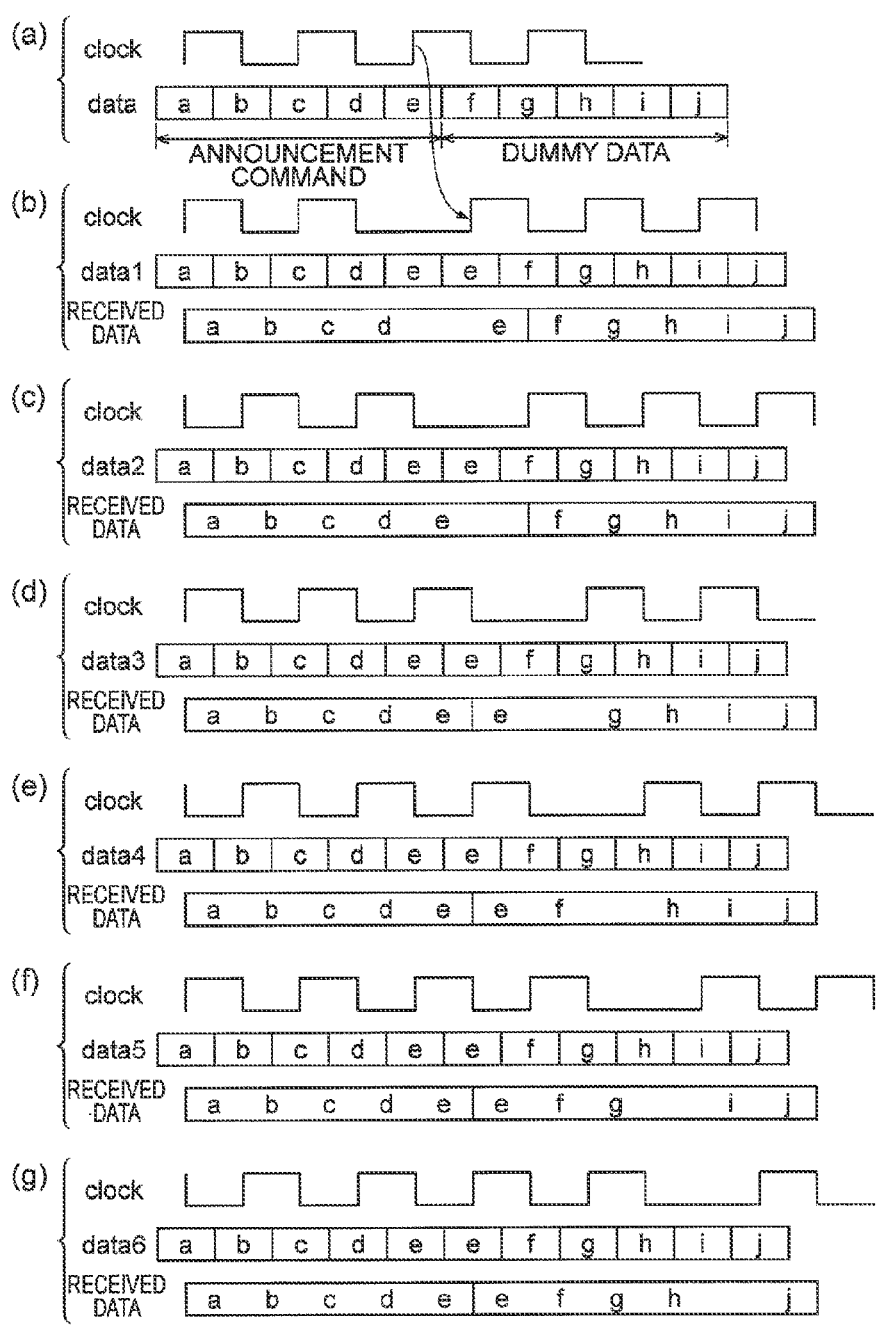

TRANSMITTING DEVICE, RECEIVING DEVICE AND TRANSMITTING/RECEIVING SYSTEM

CROSS REFERENCE TO RELATED APPLICATIONS

This application is a National Stage of International Application No. PCT/JP2011/062717 filed Jun. 2, 2011, claiming priority based on Japanese Patent Application No. 2010-174404 filed Aug. 3, 2010, the contents of all of which are incorporated herein by reference in their entirety.

TECHNICAL FIELD

The present invention relates to a transmitting device, a receiving device and a transmitting/receiving system.

BACKGROUND ART

A clock generating technology according to spread spectrum (SS) is known as a technology of reducing EMI (electro magnetic interference) noise caused by a clock in a transmitting/receiving system that transmits clock and data from a transmitting device to a receiving device. According to the SS technology, by temporally modulating the frequency of the clock transmitted from the transmitting device to the receiving device, a bandwidth of a frequency spectrum of the clock is extended and the peak intensity of the frequency spectrum is reduced, thereby reducing the EMI noise.

The transmitting device employing such SS technology needs to include a spread spectrum clock generator (SSCG) that generates a clock, the frequency of which is temporally modulated. Patent literatures 1 to 11 disclose inventions related to the SS technology and the SSCG.

CITATION LIST

Patent Literature

[Patent literature 1] Unexamined Patent Publication No. 2009-089407
[Patent literature 2] Unexamined Patent Publication No. 2008-022345
[Patent literature 3] Unexamined Patent Publication No. 2007-208705
[Patent literature 4] Unexamined Patent Publication No. 2007-158466
[Patent literature 5] Unexamined Patent Publication No. 2007-006121
[Patent literature 6] Unexamined Patent Publication No. 2006-217539
[Patent literature 7] Unexamined Patent Publication No. 2005-020083
[Patent literature 8] Unexamined Patent Publication No. 2004-328280
[Patent literature 9] Unexamined Patent Publication No. 2004-208193
[Patent literature 10] Unexamined Patent Publication No. 2004-208037
[Patent literature 11] Unexamined Patent Publication No. 2004-207846

SUMMARY OF INVENTION

Technical Problem

The transmitting device that employs the conventional SS technology and includes the conventional SSCG has a large circuit size, and the transmitting device formed of a semiconductor integrated circuit has a large semiconductor chip area.

The present invention is made to solve the above-mentioned problems and has an object to provide a transmitting device capable of reducing the EMI noise while suppressing an increase in the circuit size. Another object of the present invention is to provide a receiving device suited to receive a clock and data that are transmitted from such transmitting device and a transmitting/receiving system that includes such transmitting device and receiving device and can transmit/receive data with low noise.

Solution to Problem

A transmitting device according to the present invention includes a clock transmitting part that generates and transmits a clock intermittently phase-shifted, and a data transmitting part that transmits data in sync with the clock transmitted from the clock transmitting part.

The clock transmitting part may generate the phase-shifted clock by switching a clock selected from among multi-phase clocks and transmit the clock. The clock transmitting part may also phase-shift the clock at a transmission timing of a specified piece of data among pieces of data transmitted from the data transmitting part and transmit the clock.

In the transmitting device of the present invention, it is preferred that when the clock transmitted from the clock transmitting part is phase-shifted, the data transmitting part transmits a phase shift announcement command that announces the phase shift timing. It is preferred that immediately before the clock transmitted from the clock transmitting part is phase-shifted, the data transmitting part transmits the phase shift announcement command. Further, it is preferred that the data transmitting part transmits dummy data following the phase shift announcement command.

A receiving device of the present invention, which receives a clock and data transmitted from a transmitting device in sync with each other, includes (1) a clock receiving part that receives the clock, (2) a data receiving part that samples and receives data in sync with the clock received by the clock receiving part, and (3) a data processing part that, when the data received by the data receiving part is a phase shift announcement command that announces a timing when each of the clock received by the clock receiving part and the data received by the data receiving part is phase-shifted, invalidates data reception by the data receiving part at the timing announced by the phase shift announcement command.

A transmitting/receiving system of the present invention includes (1) the transmitting device and the receiving device of the present invention, wherein (2) the clock receiving part of the receiving device receives a clock transmitted from the clock transmitting part of the transmitting device, (3) the data receiving part of the receiving device receives data transmitted from the data transmitting part of the transmitting device, and (4) when the data that is transmitted from the data transmitting part of the transmitting device and received by the data receiving part of the receiving device is the phase shift announcement command, the data processing part of the receiving device invalidates data reception by the data receiving part at a timing announced by the phase shift announcement command.

Advantageous Effects of Invention

According to the present invention, EMI noise can be reduced while suppressing an increase in circuit size.

BRIEF DESCRIPTION OF DRAWINGS

FIGS. 17A to 17C are views illustrating a delay time difference without SS application.

FIGS. 25A to 25G are timing charts of data and clock in the transmitting/receiving system 1 in Fourth embodiment.

DESCRIPTION OF EMBODIMENTS

Figure 1:
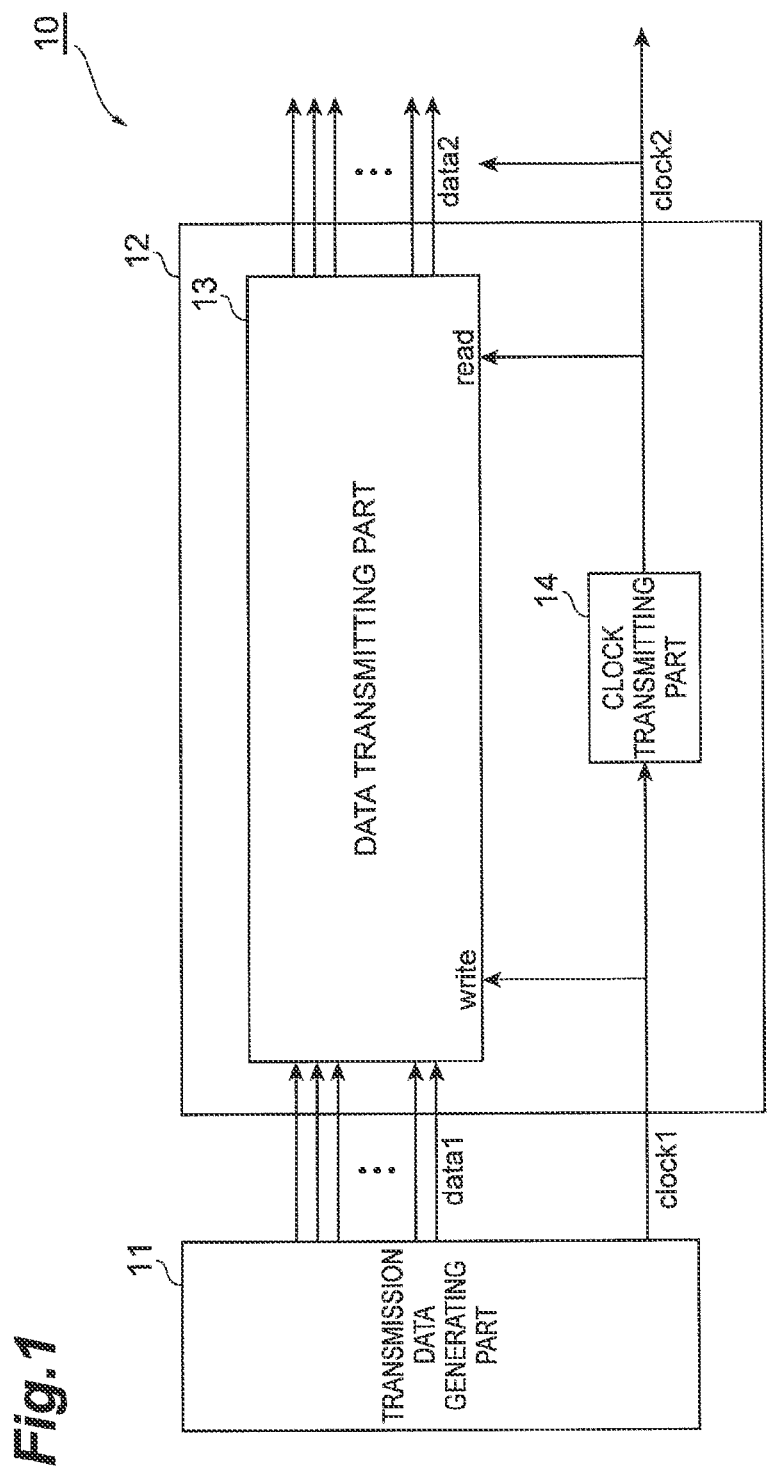
FIG. 1 is a view showing a configuration of a transmitting device 10 in a comparative example.

Embodiments for implementing the present invention will be described below in detail with reference to appended figures. In description of figures, the same or similar elements are given the same reference numerals and overlapping description thereof is omitted. First, a comparative example and then, the embodiments will be described.

Comparative Example

FIG. 1 is a view showing a configuration of a transmitting device 10 in the comparative example. The transmitting device 10 in the comparative example includes a transmission data generating part 11 and an output buffer part 12. The transmission data generating part 11 generates data 1 to be transmitted to a receiving device and a clock 1, and outputs them to the output buffer part 12. The output buffer part 12 includes a data transmitting part 13 and a clock transmitting part 14.

The data transmitting part 13 is connected to the receiving device via a high-speed serial data line. The data transmitting part 13 includes a FIFO (first-in first-out) memory, receives and stores the data 1 output from the transmission data generating part 11 in the FIFO memory and outputs data stored in the FIFO memory and dummy data added as needed as data 2 to the receiving device. A timing when the FIFO memory of the data transmitting part 13 receives and stores the data 1 is instructed according to the clock 1 output from the transmission data generating part 11. A timing when the FIFO memory of the data transmitting part 13 outputs the data 2 is instructed according to a clock 2 output from the clock transmitting part 14.

The clock transmitting part 14 is connected to the receiving device via a clock line. The clock transmitting part 14 includes an SSCG, receives the clock 1 output from the transmission data generating part 11, generates the clock 2 by temporally modulating (SS application) the frequency of the clock 1 and outputs the generated clock 2. The clock 2 output from the clock transmitting part 14 is transmitted to the receiving device as well as being used as a signal instructing output of the data 2 from the FIFO memory of the data transmitting part 13. Thereby, the data transmitting part 13 can transmit data 2 in sync with the clock 2 transmitted from the clock transmitting part 14.

Figure 2:
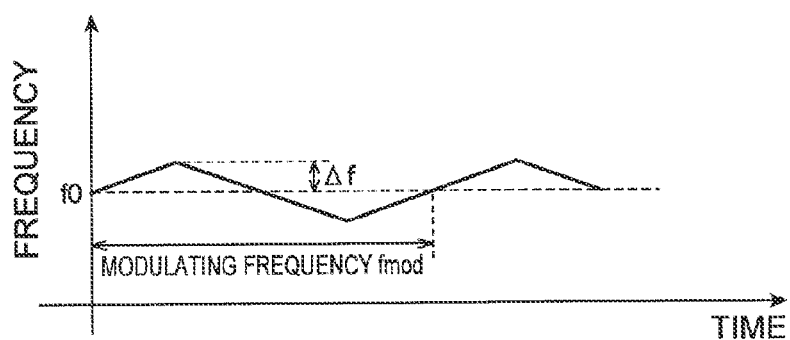
FIG. 2 is a chart showing temporal change of the frequency of a clock 2 output from the transmitting device 10 in the comparative example.

FIG. 2 is a chart showing temporal change of the frequency of the clock 2 output from the transmitting device 10 in the comparative example. In an example of SS application shown in this figure, the clock 1 before SS application has a constant frequency f0, while the frequency of the clock 2 after SS application is modulated into the shape of a triangular wave. It is defined that the modulating frequency of the clock 2 is fmod (modulation cycle is 1/fmod), the central frequency of the clock 2 is f0 and the modulation amplitude of the clock 2 is $\Delta f$.

Figure 3:
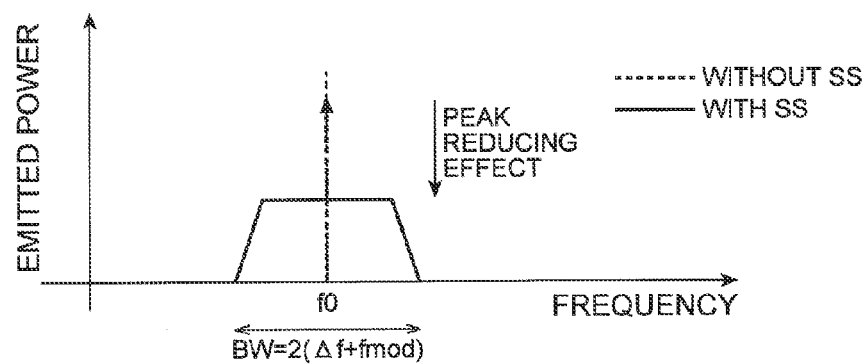
FIG. 3 is a chart showing frequency spectrum of the clock 2 output from the transmitting device 10 in the comparative example.

FIG. 3 is a chart showing the frequency spectrum of the clock 2 output from the transmitting device 10 in the comparative example. The frequency spectrum of the clock 1 before SS application concentrates on the frequency f0, while the frequency spectrum of the clock 2 after SS application as shown in FIG. 2 has a band of width 2($\Delta f$+fmod) centering on the frequency f0 and a reduced peak intensity. This can reduce the EMI noise.

Figure 4:
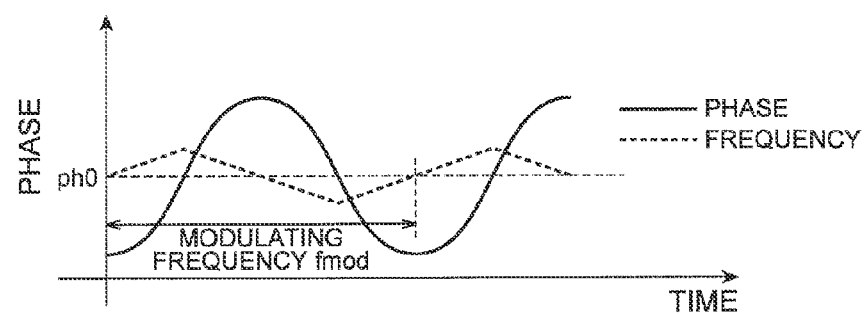
FIG. 4 is a chart showing temporal change of the phase of the clock 2 output from the transmitting device 10 in the comparative example.

FIG. 4 is a chart showing temporal change of the phase of the clock 2 output from the transmitting device 10 in the comparative example. The phase of the clock 2 after SS application is equal to the integral of a frequency f(t) shown in FIG. 2. As apparent from this figure, even when amplitude Δf of frequency modulation is small, the phase as the integral of the frequency greatly changes from a phase ph0 in the case of no SS application.

An amplitude Δph of phase change of the clock 2 after SS application is expressed in a following formula (1). Using this formula, given that the central frequency f0 is 1 GHz, the modulating frequency fmod is 30 kHz and a proportion of the modulation amplitude Δf with respect to the central frequency f0 is 3%, the amplitude Δph of phase change becomes 250·2π (rad). That is, as compared to the case of no SS application, a change of the phase of the clock 2 after SS application is about ±250 cycles at maximum.

[Formula 1]

$$|\Delta ph| = \int_{t0}^{t1} f(t)\,dt \quad (1a)$$

$$= \int_{t0}^{t1} \left\{ \Delta f - \Delta f \frac{t-t0}{t1-t0} \right\} dt$$

$$t0 = \frac{1}{4}f\text{mod} \quad (1b)$$

$$t1 = \frac{3}{4}f\text{mod} \quad (1c)$$

The clock transmitting part 14 of the transmitting device 10 in the comparative example includes an SSCG to generate and output the clock 2 after SS application as shown in FIG. 2. The SSCG basically includes a PLL (phase lock loop) circuit configuration, and generates and outputs the clock 2, which is frequency-modulated by the PLL circuit. However, the SSCG including such PLL circuit has a large circuit size and is vulnerable to noise.

The data transmitting part 13 of the transmitting device 10 in the comparative example receives the data 1 in sync with the clock 1 before SS application, and outputs the data 2 in sync with the clock 2 after SS application. The output data 2 has the phase difference Δph with respect to the input data 1. In order to prevent an error of data transmission/reception due to the phase difference, the transmitting device 10 needs to include a FIFO memory. The capacity of the FIFO memory needs to be larger as the amplitude Δph of phase change of clock 2 after SS application is larger. Accordingly, such FIFO memory also has a large circuit size.

The transmitting device 10 in the comparative example has a large circuit size as described above, and when the transmitting device 10 is formed of a semiconductor integrated circuit, an area of the semiconductor chip area is large. On the contrary, in below-mentioned transmitting devices 10A to 10D in this embodiment, a clock transmitting part generates and transmits a clock intermittently phase-shifted, thereby eliminating the necessity of the SSCG. As a result, EMI noise can be reduced while suppressing an increase in a circuit size.

First Embodiment

Figure 5:
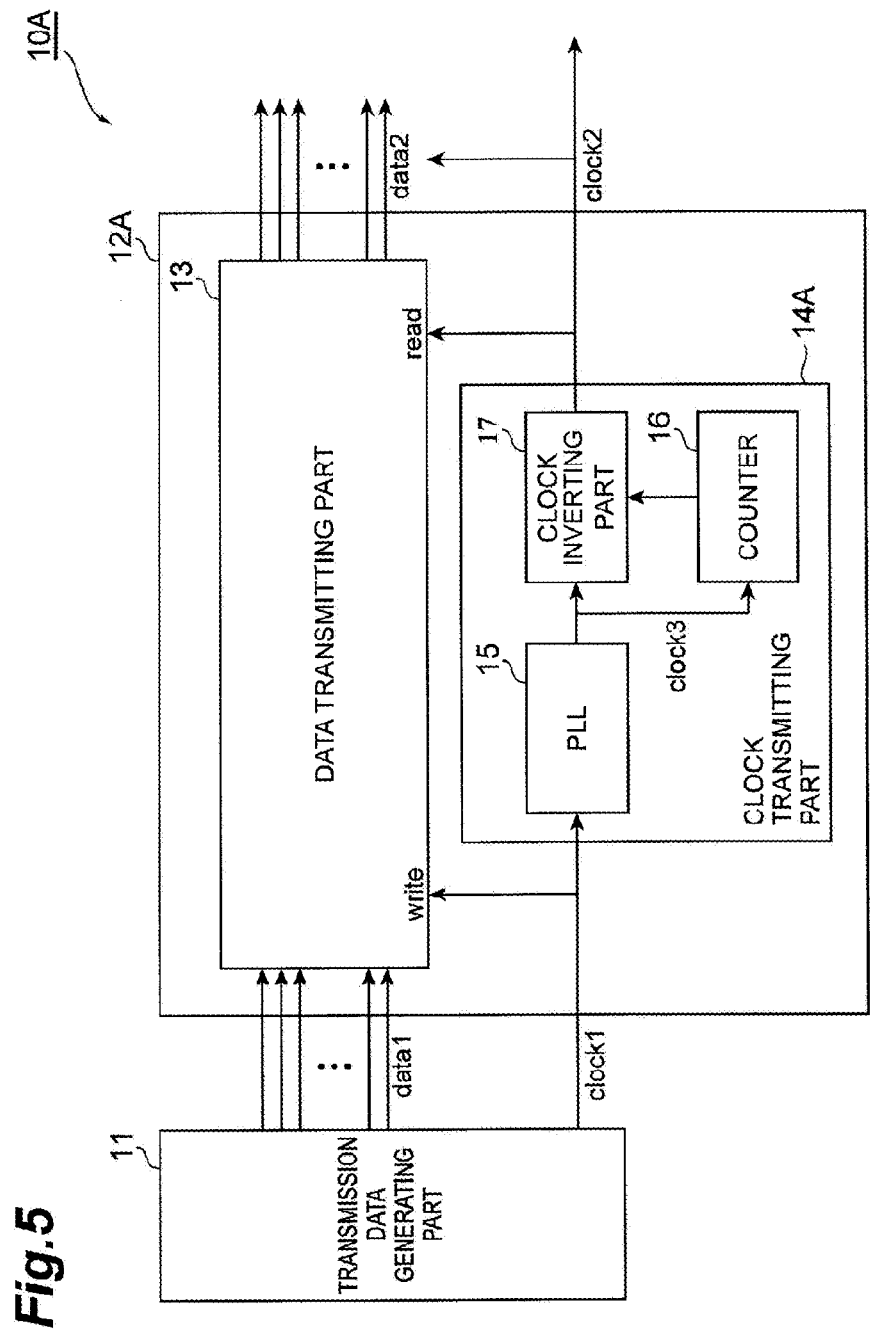
FIG. 5 is a view showing a configuration of a transmitting device 10A in First embodiment.

FIG. 5 is a view showing a configuration of a transmitting device 10A in First embodiment. The transmitting device 10A in First embodiment includes the transmission data generating part 11 and an output buffer part 12A. The transmission data generating part 11 generates the data 1 and the clock 1, which are to be transmitted to the receiving device, and outputs them to the output buffer part 12A. The output buffer part 12A includes the data transmitting part 13 and a clock transmitting part 14A.

The transmitting device 10A in First embodiment shown in FIG. 5 differs from the transmitting device 10 in the comparative example shown in FIG. 1 in that the output buffer part 12A is provided in place of the output buffer part 12 and the clock transmitting part 14A is provided in place of the clock transmitting part 14. The clock transmitting part 14A includes a PLL 15, a counter 16 and a clock inverting part 17, and can generate the clock 2 intermittently phase-shifted on the basis of the input clock 1 and transmit the clock 2. Given that the amount of phase shift is π (180 degrees), the clock 2 intermittently phase-shifted is equal to the clock 2, voltage amplitude of which is intermittently inverted.

PLL 15 receives the clock 1 output from the transmission data generating part 11, generates a clock 3 having a frequency obtained by multiplying the frequency of the input clock 1 by a certain value and outputs the clock 3. The counter 16 receives the clock 3 output from the PLL 15, counts a pulse of the clock 3 and outputs a clock inversion control signal having a significant value for a certain period for every certain number of pulses.

The clock inverting part 17 receives the clock 3 output from the PLL 15 as well as the clock inversion control signal output from the counter 16, switches between the positive phase and the negative phase of the clock 3 each time the clock inversion control signal has a significant value and outputs the clock as the clock 2. The data transmitting part 13 transmits the data 2 in sync with the clock 2 output from the clock inverting part 17 of the clock transmitting part 14A.

Figure 6:
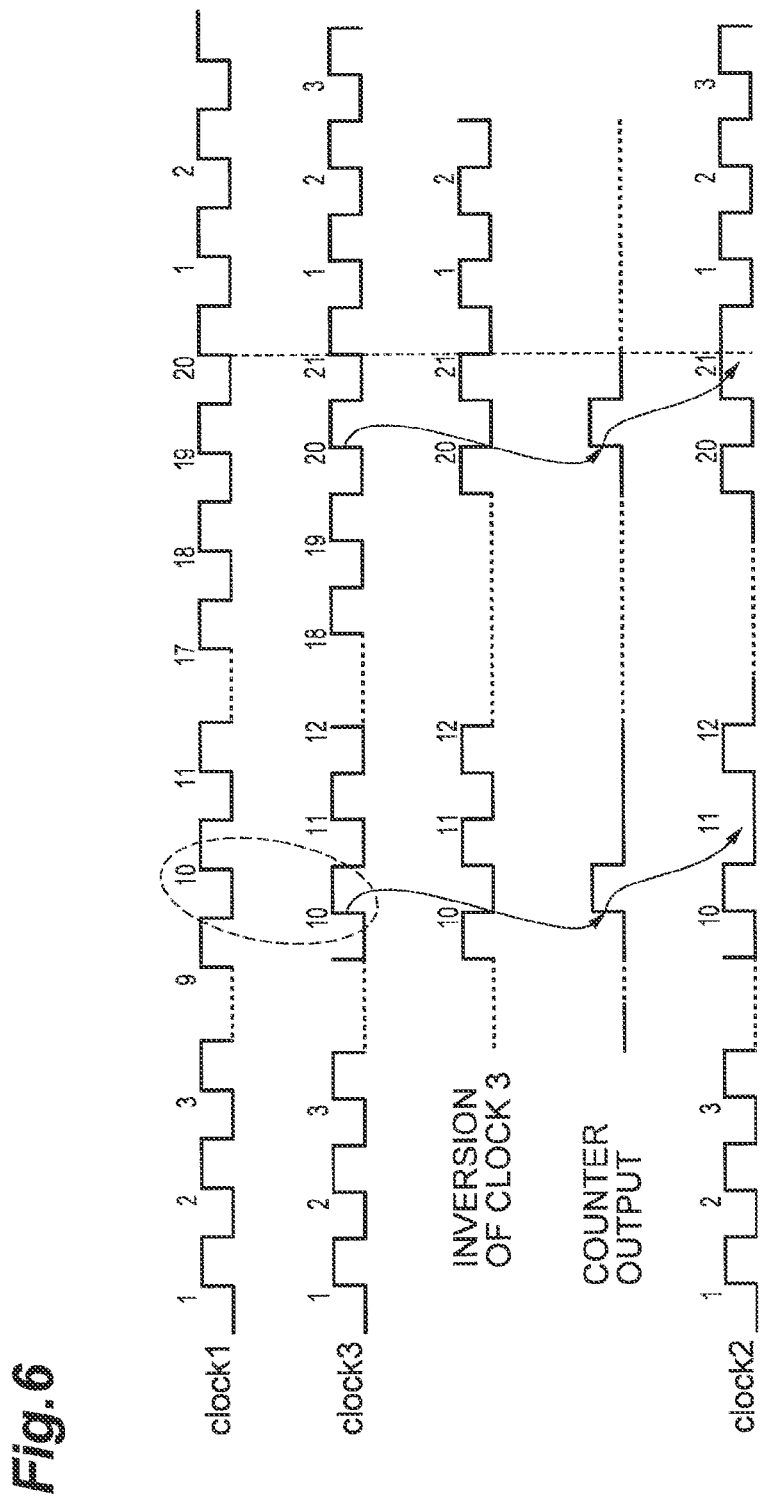
FIG. 6 is timing charts of a clock 1, a clock 2, a clock 3 and so on in the transmitting device 10A in First embodiment.

FIG. 6 is timing charts of the clock 1, the clock 2, the clock 3 and so on in the transmitting device 10A in First embodiment. This figure shows, from the top, the clock 1 input to the PLL 15, the clock 3 output from the PLL 15, a signal inverted from the clock 3, the clock inversion control signal output from the counter 16 and the clock 2 output from the clock inverting part 17.

In the figure, the frequency of the clock 3 output from the PLL 15 is 21/20 times as high as the frequency of the clock 1 input to the PLL 15. That is, a period of 21 pulses of the clock 3 is equal to a period of 20 pulses of the clock 1. A timing of an edge of a pulse #21 of the clock 3 is the same as that of an edge of a pulse #20 of the clock 1. The clock inversion control signal output from the counter 16 is put into High level for a certain period for every 10 pulses of the clock 3. Each time the clock inversion control signal is put into High level (that is, every 10 pulses of the clock 3), the clock 2 output from the clock inverting part 17 has the positive phase and the negative phase switched from those of the clock 3 and thus, the phase is shifted by 7E.

In such operation, in the clock 2 output from the clock inverting part 17, an edge corresponding to an edge of a pulse #11 of the clock 3 output from the PLL 15 is lost. Accordingly, during a period of 20 pulses of the clock 1, 21 pulses of the clock 3 are generated and 20 pulses of the clock 2 are generated.

Figure 7:
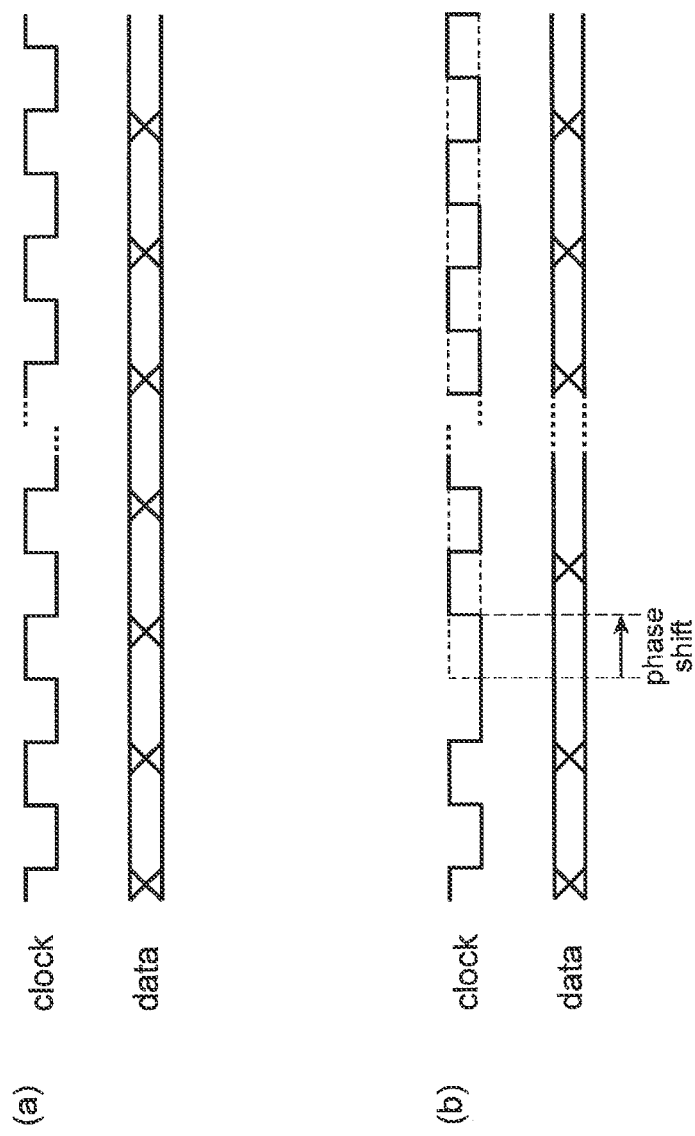
FIGS. 7A and 7B are timing charts of data and clock, which are output from the transmitting device 10A in First embodiment.

FIGS. 7A and 7B are timing charts of data and clock, which are output from the transmitting device 10A in First embodiment. In FIG. 7A, the clock has no phase shift. In FIG. 7B, the clock is intermittently phase-shifted by π. In both cases, the receiving device that receives the data and clock, which are output from the transmitting device 10A, may sample data at an edge of the clock pulse.

Figure 8:
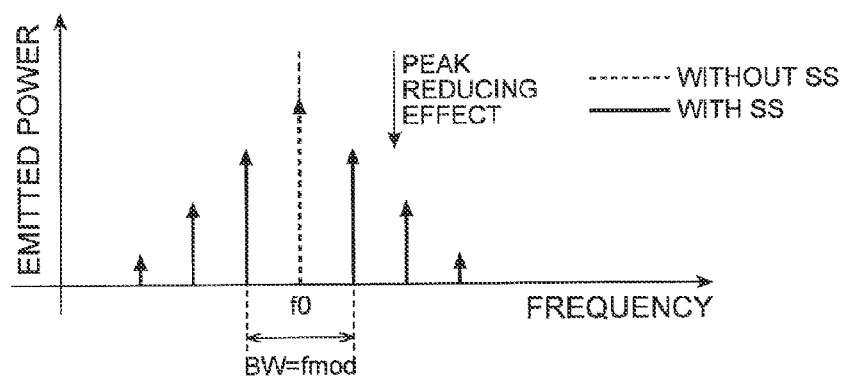
FIG. 8 is a view showing an example of a frequency spectrum of a clock output from the transmitting device 10A in First embodiment.

FIG. 8 is a view showing an example of a frequency spectrum of a clock output from the transmitting device 10A in First embodiment. The frequency spectrum of the clock 1 concentrates on the frequency f0, while the frequency spectrum of the clock 2 output from the transmitting device 10A in First embodiment has no frequency f0 component and has peaks at f0±fmod/2, f0±fmod, f0±3fmod/2, . . . , and reduced peak intensity. This can reduce EMI noise. fmod is a frequency at the timing when the clock is phase-shifted.

In the above description, the clock output from the transmitting device 10A is phase-shifted for every certain pulses (that is, at the certain frequency fmod). However, the clock 2 output from the transmitting device 10A may be phase-shifted for every N1 pulses and for every N2 pulses. In this case, a frequency division ratio of the PLL 15 is (N1+N2+1)/(N1+N2), and the counter 16 may output the clock inversion control signal that has a significant value for a certain period each time the number of pulses N1, N2 of the clock 3 is counted.

Figure 9:
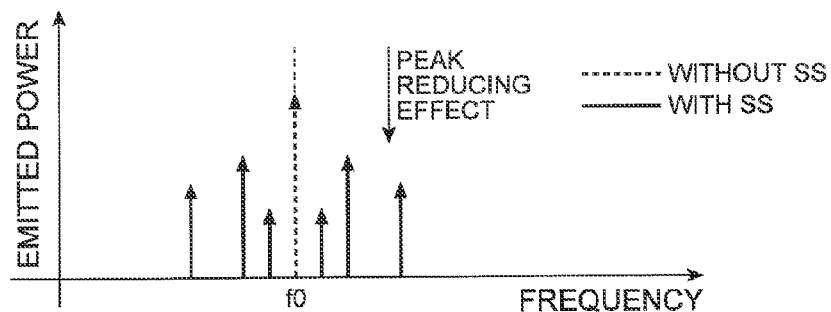
FIG. 9 is a view showing another example of the frequency spectrum of the clock output from the transmitting device 10A in First embodiment.

FIG. 9 is a view showing another example of the frequency spectrum of the clock output from the transmitting device 10A in First embodiment. By changing the fmod and the amount of phase shift, the peak intensity of the spectrum can be further reduced, thereby further reducing EMI noise.

Figure 10:
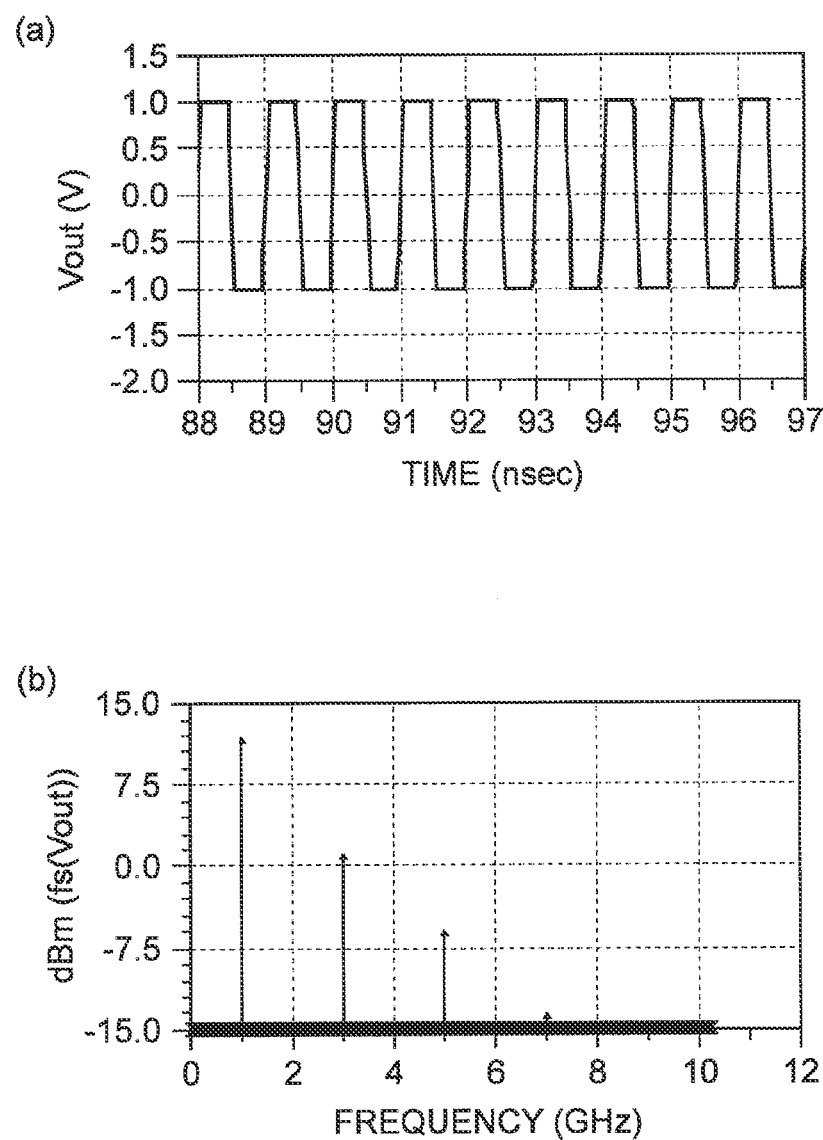
FIGS. 10A and 10B are views showing waveform and frequency spectrum of the clock without SS application.
Figure 11:
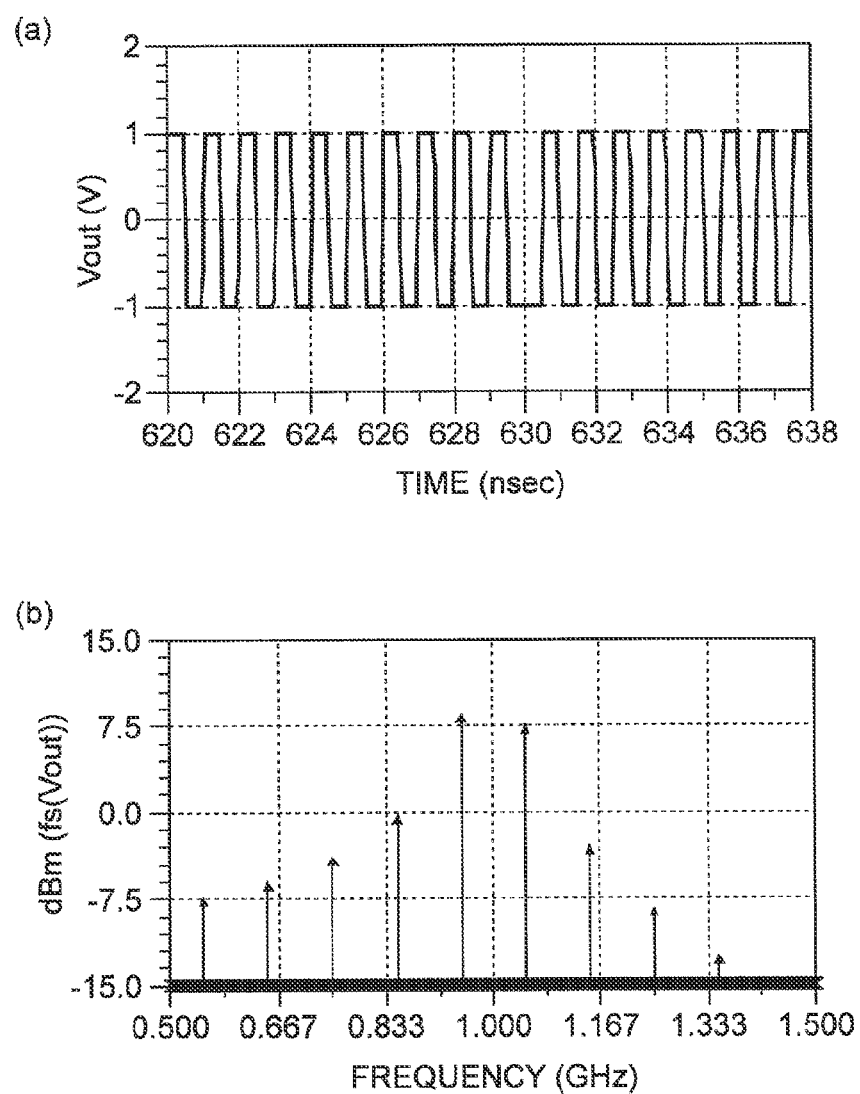
FIGS. 11A and 11B are views showing waveform and frequency spectrum of the clock when the clock is phase-shifted by $\pi$ for every 10 pulses in First embodiment.
Figure 12:
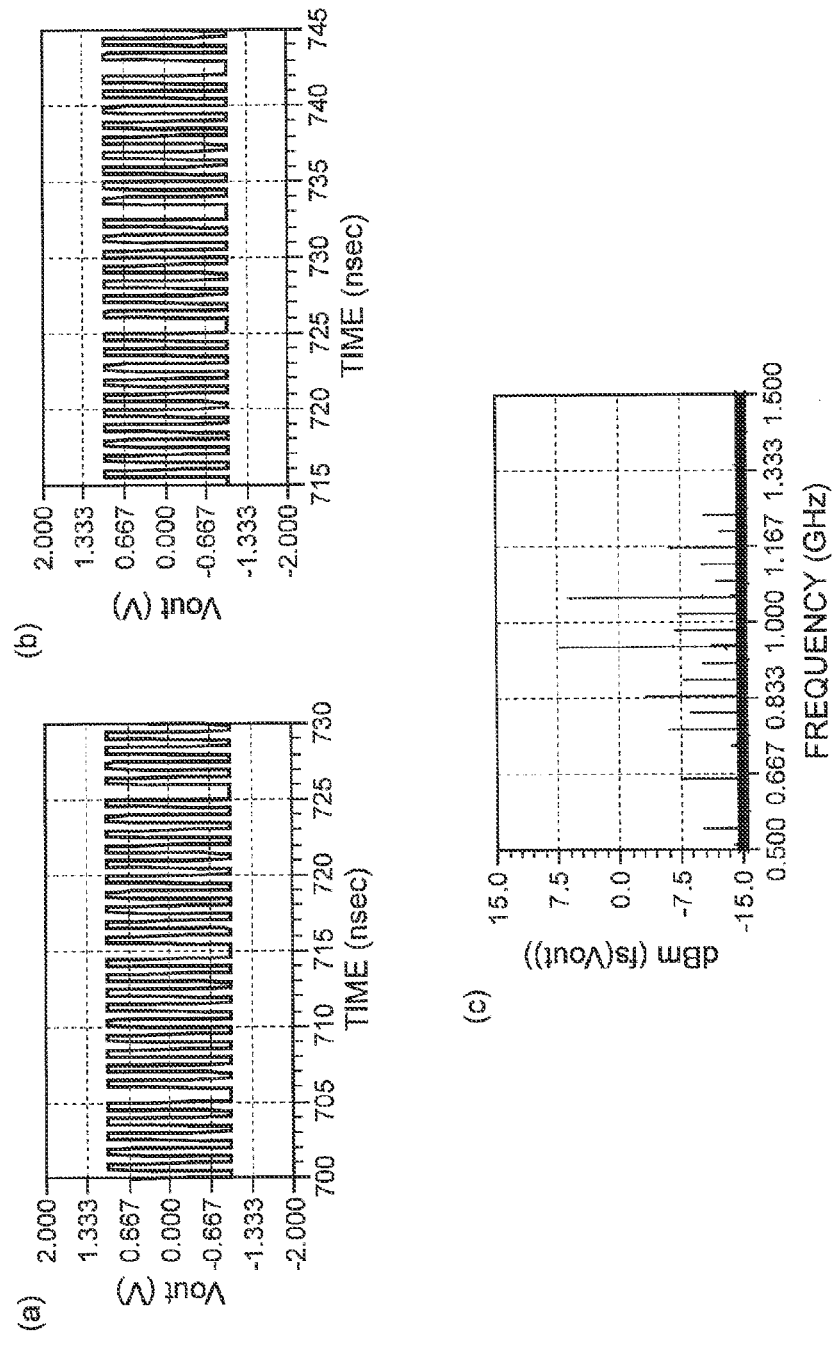
FIGS. 12A to 12C are views showing waveform and frequency spectrum of the clock when the clock is phase-shifted by $\pi$ for every 9 pulses and for every 7 pulses in First embodiment.

Referring to FIG. 10A to FIG. 12C, simulation calculation results of the frequency spectrum of the clock will be described. FIGS. 10A and 10B are views showing waveform and frequency spectrum of the clock without SS application, in which FIG. 10A shows the clock waveform, and FIG. 10B shows the frequency spectrum. FIGS. 11A and 11B are views showing waveform and frequency spectrum when the clock is phase-shifted by π for every 10 pulses, in which FIG. 11A shows the clock waveform, and FIG. 11B shows the frequency spectrum. FIGS. 12A to 12C are views showing waveform and frequency spectrum when the clock is phase-shifted by π for every 9 pulses and for every 7 pulses in First embodiment, in which FIG. 12A shows the waveform of the clock phase-shifted for every 9 pulses, FIG. 12B shows the waveform of the clock phase-shifted for every 7 pulses, and FIG. 12C shows the frequency spectrum. As apparent from comparison of these figures, the spectrum peak intensity is reduced when the clock is phase-shifted by π for every 10 pulses (FIGS. 11A and 11B) than when the SS is not applied (FIGS. 10A and 10B), and the spectrum peak intensity is further reduced when the clock is phase-shifted for every 9 pulses and for every 7 pulses (FIGS. 12A to 12C).

Although the transmitting device 10 in the comparative example requires the SSCG having a large circuit size and the FIFO memory, the transmitting device 10A in First embodiment only needs to include the PLL having a fixed frequency division ratio and a FIFO memory having a low capacity value and therefore, EMI noise can be reduced while suppressing an increase in a circuit size, and when the transmitting device is formed of the semiconductor integrated circuit, the area of the semiconductor chip is small.

Second Embodiment

Figure 13:
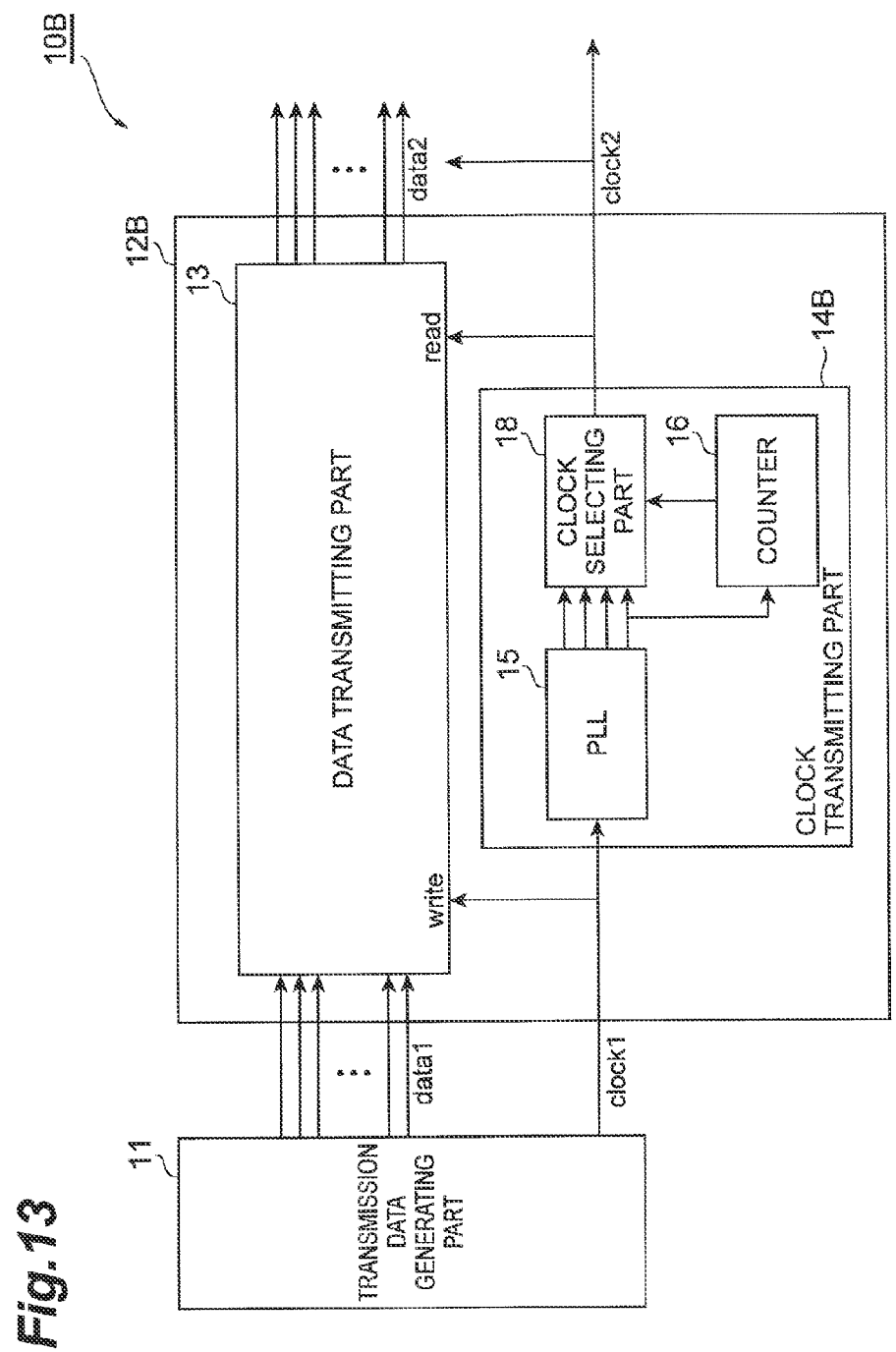
FIG. 13 is a view showing a configuration of a transmitting device 10B in Second embodiment.

FIG. 13 is a view showing a configuration of a transmitting device 10B in Second embodiment. The transmitting device 10B in Second embodiment includes the transmission data generating part 11 and an output buffer part 12B. The transmission data generating part 11 generates the data 1 and the clock 1, which are to be transmitted to the receiving device, and outputs them to the output buffer part 12B. The output buffer part 12B includes the data transmitting part 13 and a clock transmitting part 14B.

The configuration of the transmitting device 10B in Second embodiment shown in FIG. 13 differs from that of the transmitting device 10A in First embodiment shown in FIG. 5 in that the output buffer part 12B is provided in place of the output buffer part 12A and the clock transmitting part 14B is provided in place of the clock transmitting part 14A. The clock transmitting part 14B includes the PLL 15, the counter 16 and a clock selecting part 18, and can generate the clock 2 intermittently phase-shifted on the basis of the input clock 1 and transmit the clock 2.

The PLL 15 receives the clock 1 output from the transmission data generating part 11, generates a multi-phase clock 3 having a frequency obtained by multiplying the frequency of the input clock 1 by a certain value and outputs the multi-phase clock 3. The counter 16 receives any clock of the multi-phase clock 3 output from the PLL 15, counts the input clock pulse and outputs a clock selection control signal for every certain numbers of clocks.

The clock selecting part 18 receives the multi-phase clock 3 output from the PLL 15 as well as the clock selection control signal output from the counter 16, selects one clock indicated by the clock selection control signal of the multi-phase clock 3 and outputs the selected clock as the clock 2. The data transmitting part 13 transmits the data 2 in sync with the clock 2 output from the clock selecting part 18 of the clock transmitting part 14B.

In comparison with First embodiment, in Second embodiment, since the phase-shifted clock can be generated by switching a clock selected from among the multi-phase clocks and transmitted, the clock 2 having a more complicated spectrum can be output. Thus, the spectrum peak intensity can be further reduced, achieving further reduction of EMI noise.

Third Embodiment

In each of First embodiment and Second embodiment described above, the receiving device can receive data transmitted to the receiving device without any loss. In actual some applications, however, data loss may be allowed. For example, data in a blanking period in a video signal may be lost. The blanking period occurs at a certain cycle. In such case, the clock transmitting part does not need to include the PLL. The transmitting device 10C in Third embodiment intermittently phase-shifts the clock according to a blanking indicating signal indicating the blanking period.

Figure 14:
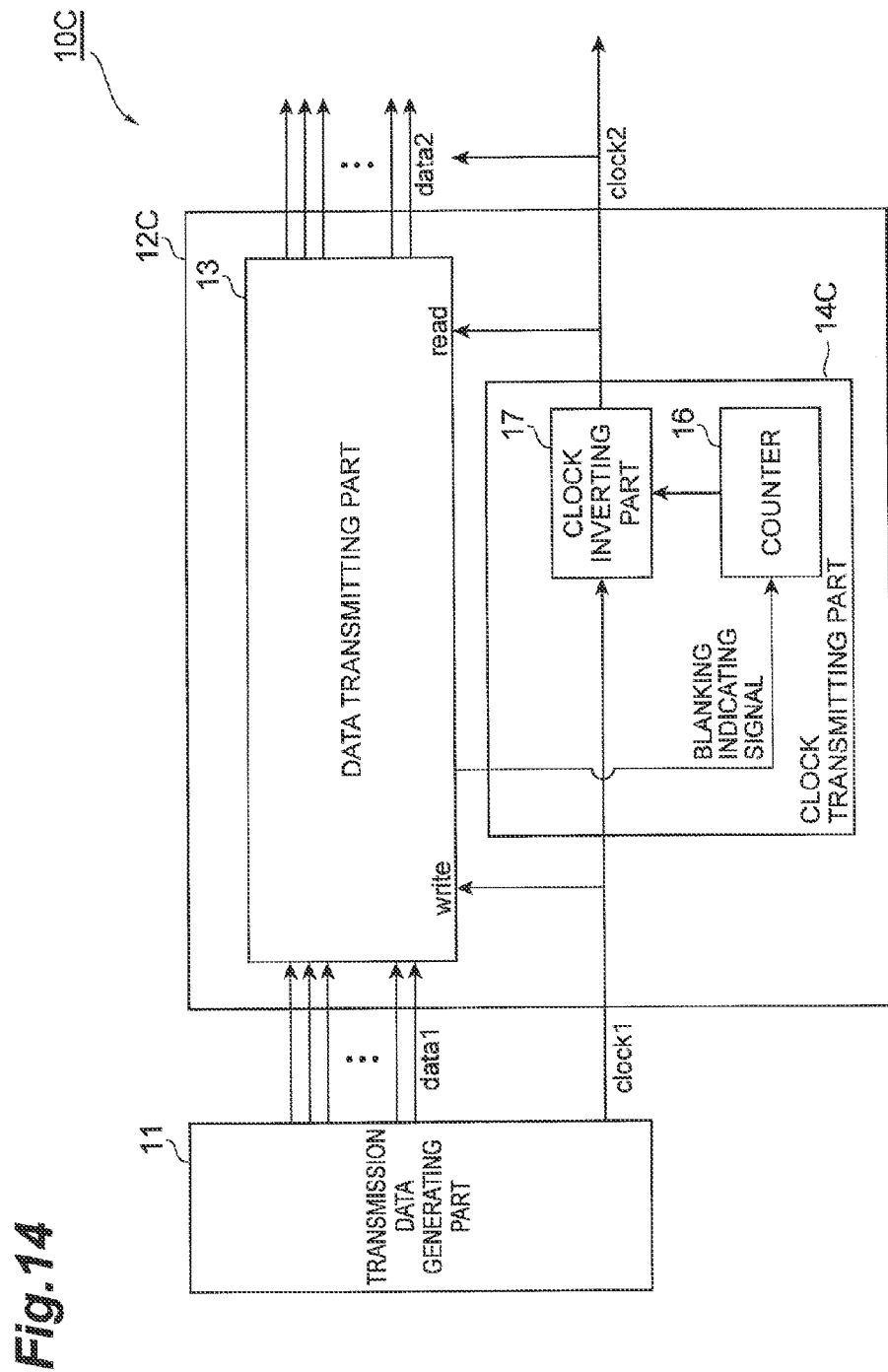
FIG. 14 is a view showing a configuration of a transmitting device 10C in Third embodiment

FIG. 14 is a view showing a configuration of a transmitting device 10C in Third embodiment. The transmitting device 10C in Third embodiment includes the transmission data generating part 11 and an output buffer part 12C. The transmission data generating part 11 generates the data 1 and the clock 1, which are to be transmitted to the receiving device, and outputs them to the output buffer part 12C. The output buffer part 12C includes the data transmitting part 13 and a clock transmitting part 14C.

The configuration of the transmitting device 10C in Third embodiment shown in FIG. 14 differs from that of the transmitting device 10A in First embodiment shown in FIG. 5 in that the output buffer part 12C is provided in place of the output buffer part 12A and the clock transmitting part 14C is provided in place of the clock transmitting part 14A. The clock transmitting part 14C includes the counter 16 and the clock inverting part 17, and can generate the clock 2 intermittently phase-shifted on the basis of the input clock 1 and transmits the clock 2.

The counter 16 receives the blanking indicating signal indicating the blanking period in a video signal data 1, counts an event that the blanking indicating signal has a significant value, and outputs the clock inversion control signal that has the significant value for a certain period for every certain numbers of counts.

The clock inverting part 17 receives the clock 1 output from the transmission data generating part 11 as well as the clock inversion control signal output from the counter 16, switches between the positive phase and the negative phase of the clock 1 each time the clock inversion control signal has the significant value and outputs the clock as the clock 2. The data transmitting part 13 transmits the data 2 in sync with the clock 2 output from the clock inverting part 17 of the clock transmitting part 14C.

Figure 15:
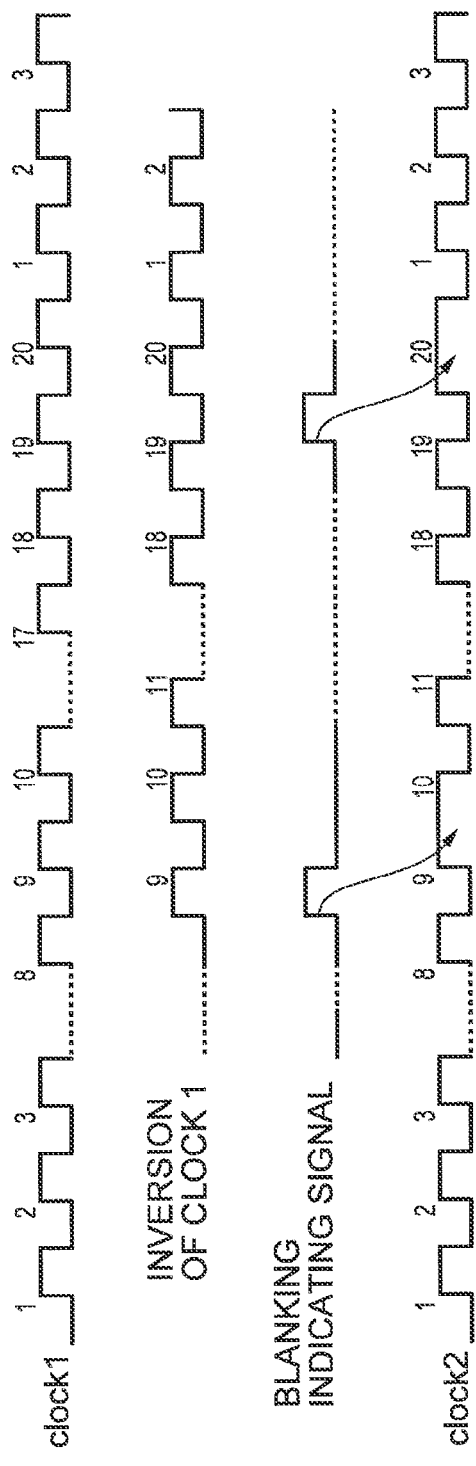
FIG. 15 is timing charts of a clock 1, a clock 2 and so on in the transmitting device 10C in Third embodiment.

FIG. 15 is timing charts of a clock 1, a clock 2 and so on in the transmitting device 10C in Third embodiment. This figure shows, from the top, the clock 1 input to the clock inverting part 17, a signal inverted from the clock 1, the blanking indicating signal and the clock 2 output from the clock inverting part 17.

As shown in this figure, in Third embodiment, the clock inverting part 17 switches between the positive phase and the negative phase of the clock 1 according to the blanking indicating signal indicating the blanking period and outputs the clock as the clock 2. Since a pulse #10 is lost in the output clock 2, data in sync with a pulse edge is also lost. However, since this loss timing is in the blanking period, no effect is made on video data.

Phase shift may be made each time the blanking indicating signal appears, and in this case, the counter 16 is unnecessary. However, when phase shift is made once out of several times when the blanking indicating signal appears, the counter 16 may be provided as shown in the figure. Another specific signal indicating a timing when data loss is allowed may be used in place of the blanking indicating signal.

Fourth Embodiment

Figure 16:
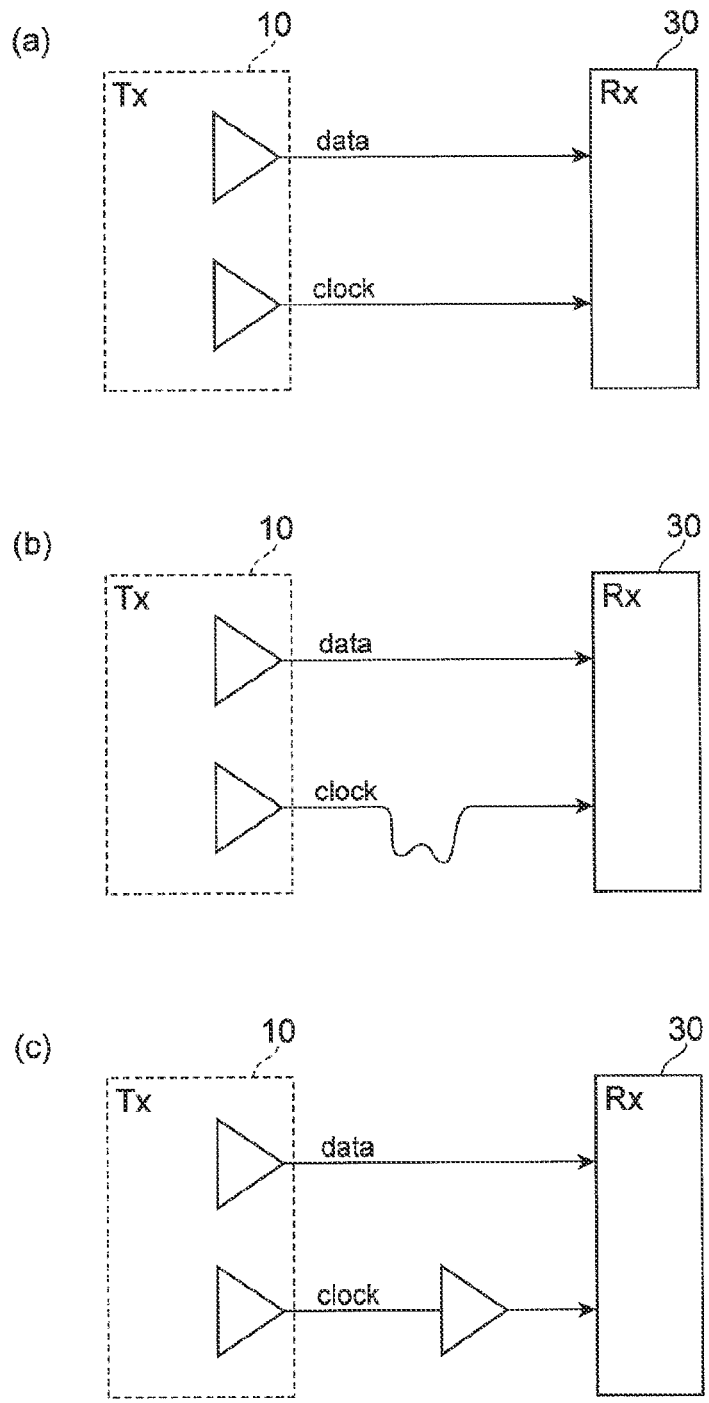
FIGS. 16A to 16C are views illustrating relationship between a data signal line and a clock signal line in length from a transmitting device to a receiving device.

In the above description of each embodiment, a delay time difference between data and clock from the transmitting device to the receiving device is not considered. However, actually, it is not limited to a situation in which a data signal line and a clock signal line from the transmitting device 10 to the receiving device 30 are equal to each other in length as shown in FIG. 16A, and the clock signal line may be longer than the data signal line as shown in FIG. 16B. As shown in FIG. 16C, a buffer may be inserted in the middle of the clock signal line. Alternatively, when a common clock is transmitted from one transmitting device to a plurality of receiving devices, different number of buffers may be inserted in the middle of the clock signal lines from the transmitting device to the receiving devices. In these cases, the delay time difference between data and clock from the transmitting device to the receiving device occurs.

When the delay time difference exists between data and clock from the transmitting device to the receiving device, if SS application is not performed, the receiving device can receive data output from the transmitting device without any error by compensating the delay time difference. The compensation of the delay time difference may be performed on the side of the transmitting device, on the side of the receiving device or in another device inserted for compensation.

FIGS. 17A to 17C are views illustrating the delay time difference without SS application. A clock shown in FIG. 17A has a constant cycle. A clock 2 shown in FIG. 17B has a small delay time difference relative to the clock shown in FIG. 17A. A clock 2 shown in FIG. 17C has a delay time difference of one cycle relative to the clock 2 shown in FIG. 17B. In each case, since the delay time difference is temporally constant, once the delay time difference is compensated, the effect is maintained thereafter.

Figure 18:
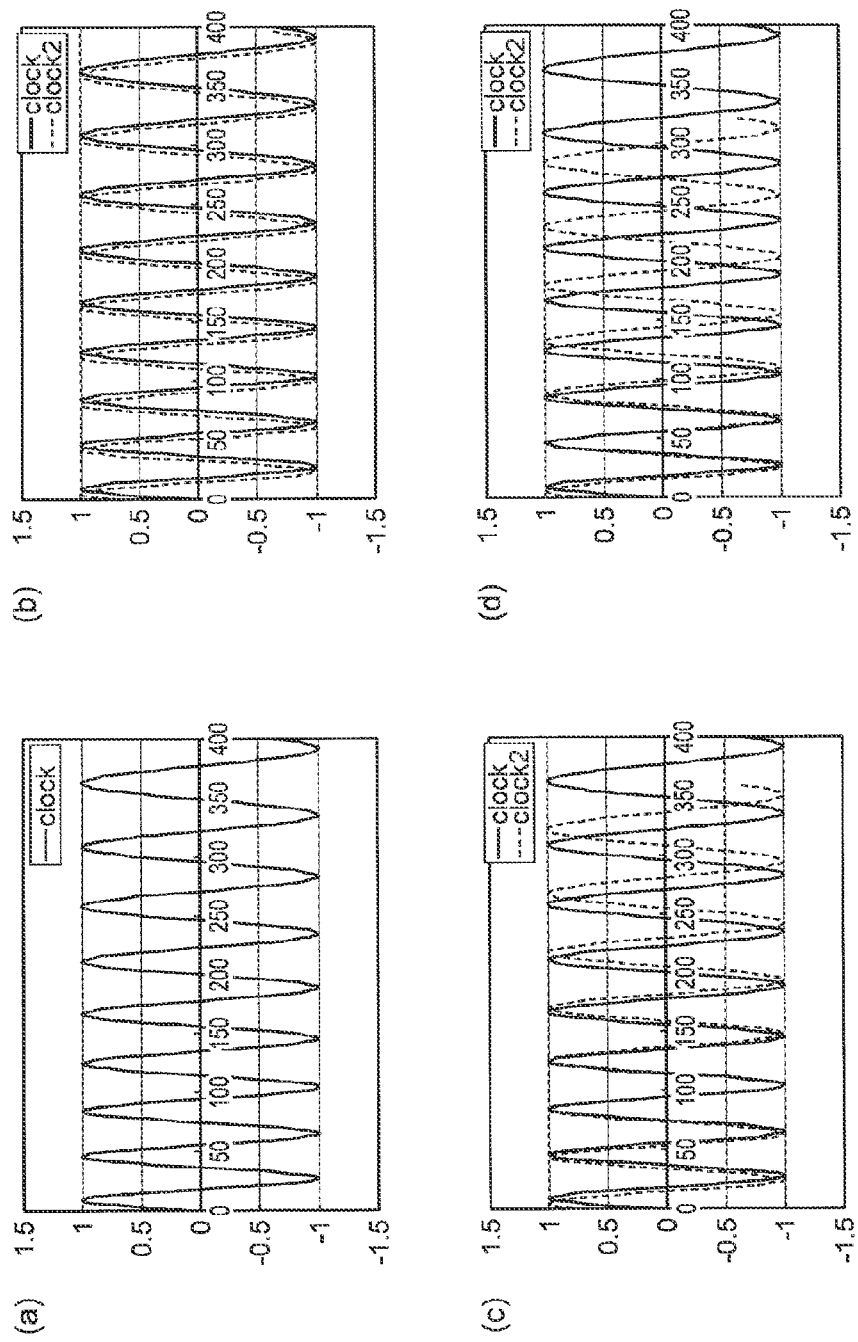
FIGS. 18A to 18D are views illustrating the delay time difference with SS application in the comparative example.

FIGS. 18A to 18D are views illustrating the delay time difference with SS application in the comparative example. The cycle of a clock shown in FIG. 18A is gradually increased. A clock 2 shown in FIG. 18B has a small delay time difference relative to the clock shown in FIG. 18A. A clock 2 shown in FIG. 18C has a delay time difference of one cycle relative to the clock 2 shown in FIG. 18B. A clock 2 shown in FIG. 18D has a delay time difference of one cycle relative to the clock 2 shown in FIG. 18C.

When the delay time difference is equal to or smaller than one cycle as shown in FIG. 18B, since the delay time difference is temporally constant, once the delay time difference is compensated, the effect is maintained thereafter. However, when the delay time difference is equal to or larger than one cycle as shown in FIG. 18C, since the delay time difference varies with time, even if the delay time difference is compensated at a certain time point, the effect is not maintained and the delay time difference must be compensated at all times. When the delay time difference is further increased as shown in FIG. 18D, the delay time difference greatly changes and adjustment becomes more difficult.

Figure 19:
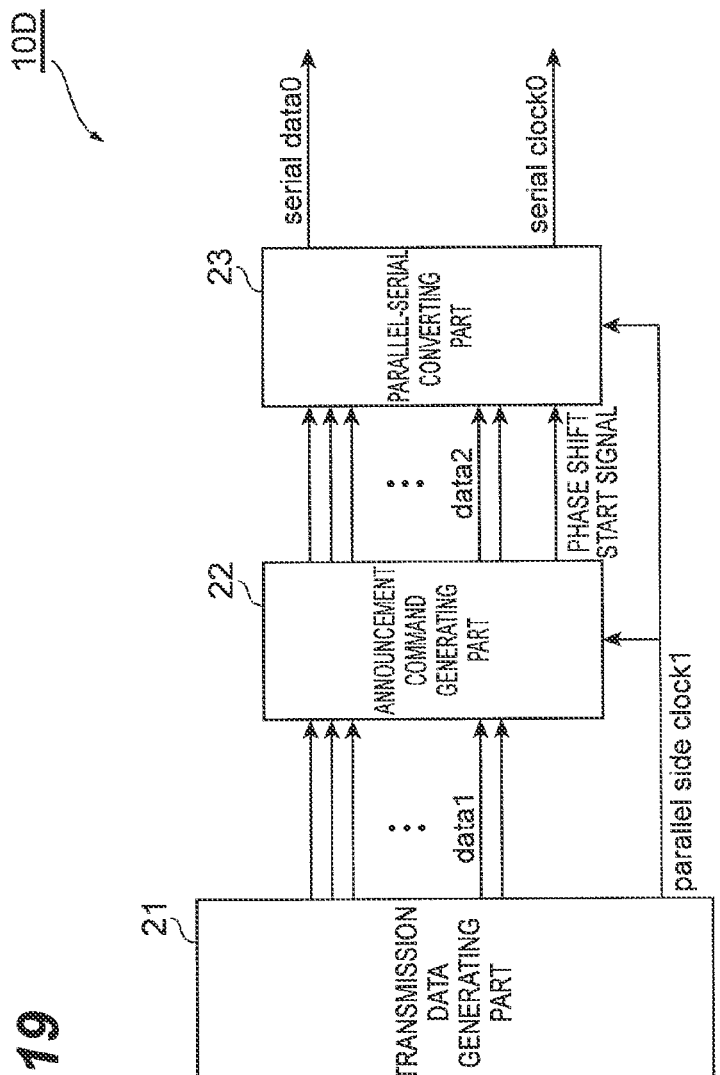
FIG. 19 is a view showing a configuration of a transmitting device 10D in Fourth embodiment.
Figure 20:
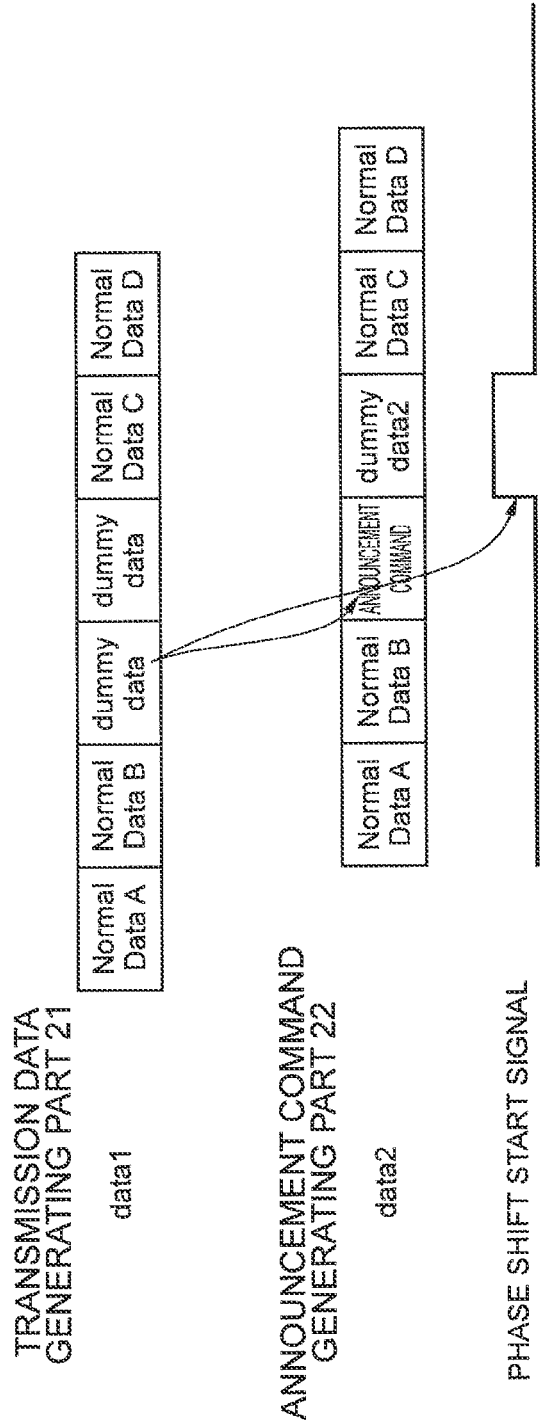
FIG. 20 is a timing chart of each piece of data in the transmitting device 10D in Fourth embodiment.

A below-mentioned transmitting/receiving system including a transmitting device and a receiving device in Fourth embodiment is suitable for the case where the delay time difference exists between data and clock from the transmitting device to the receiving device. FIG. 19 is a view showing a configuration of the transmitting device 10D in Fourth embodiment. FIG. 20 is a timing chart of each piece of data in the transmitting device 10D in Fourth embodiment. The transmitting device 10D in Fourth embodiment includes a transmission data generating part 21, an announcement command generating part 22 and a parallel-serial converting part 23.

The transmission data generating part 21 generates the data 1 and the clock 1, which are to be transmitted to the receiving device, and outputs them to the announcement command generating part 22. The transmission data generating part 21 intermittently inserts dummy data (dummy data) in the middle of pieces of data (Normal Data) to be transmitted to the receiving device. The dummy data is inserted at a timing when the clock is phase-shifted, and occupies at least two decode minimum units of transmission data.

The announcement command generating part 22 receives the data 1 output from the transmission data generating part 21, detects the dummy data in the data 1 and replaces a first unit of the dummy data with the phase shift announcement command. The second and subsequent units of the dummy data may be transmitted to the receiving device as they are unless the transmission generates a problem. However, if a trouble occurs on the side of the receiving device when the second and subsequent units of the dummy data may be transmitted to the receiving device as they are, the announcement command generating part 22 replaces the dummy data with another dummy data (dummy data 2) that does not generate a trouble.

The announcement command generating part 22 outputs the data 2 after replacement to the parallel-serial converting part 23. The announcement command generating part 22 outputs a phase shift start signal that instructs to phase-shift the clock at a timing of the dummy data (the dummy data or the dummy data 2) in the data 2 to the parallel-serial converting part 23.

The parallel-serial converting part 23 receives the data 2 and the phase shift start signal, which are output from the announcement command generating part 22. Then, like the output buffers 14A to 14C in First to Third embodiments, the parallel-serial converting part 23 transmits a clock (serial clock 0) phase-shifted at the timing indicated by the phase shift start signal, and transmits serial data (serial data 0) converted from the data 2 in sync with the clock. The serial data (serial data 0) contains the phase shift announcement command that announces the timing when the clock (serial clock 0) is phase-shifted, and also contains the dummy data (the dummy data or the dummy data 2) following the phase shift announcement command.

Figure 21:
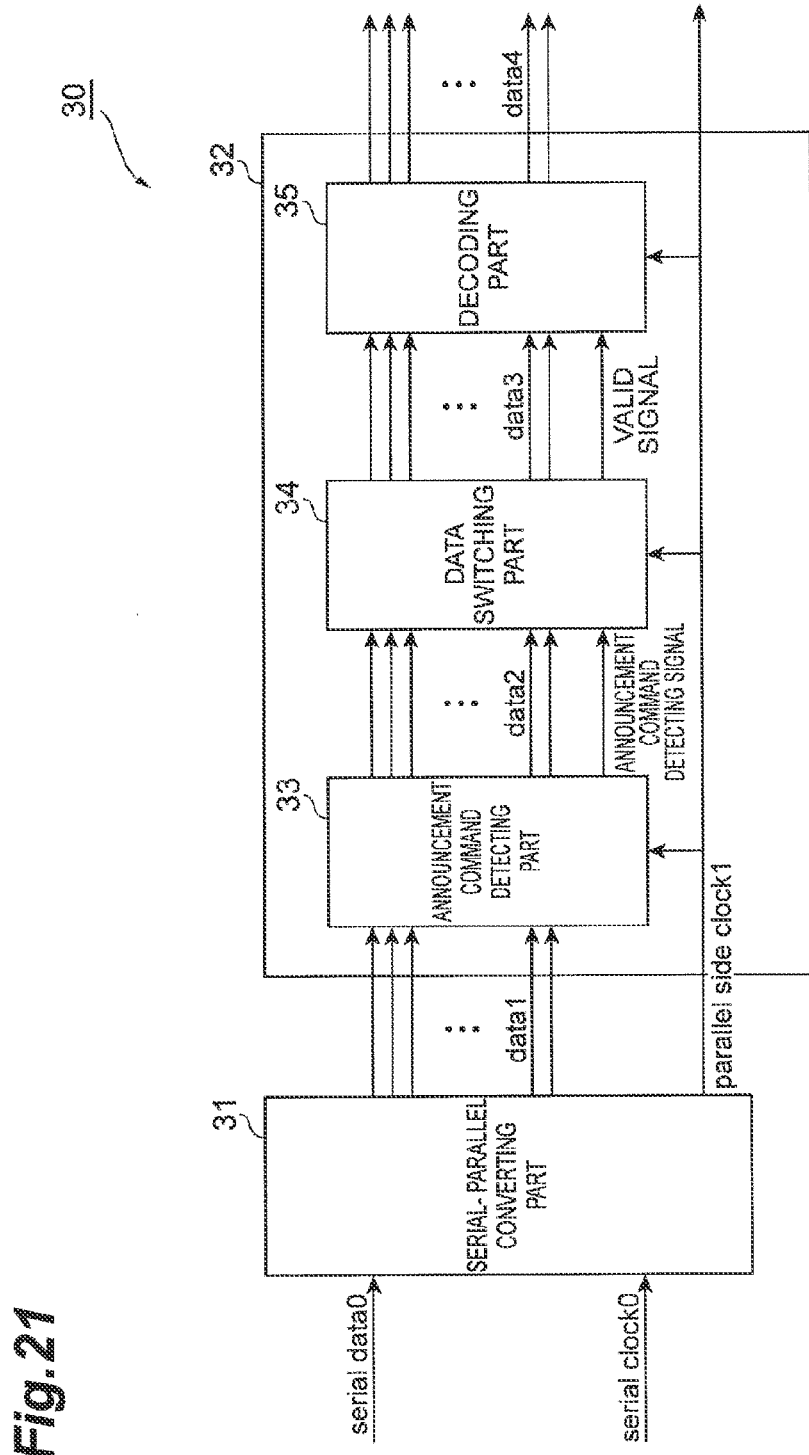
FIG. 21 is a view showing a configuration of a receiving device 30 in Fourth embodiment.
Figure 22:
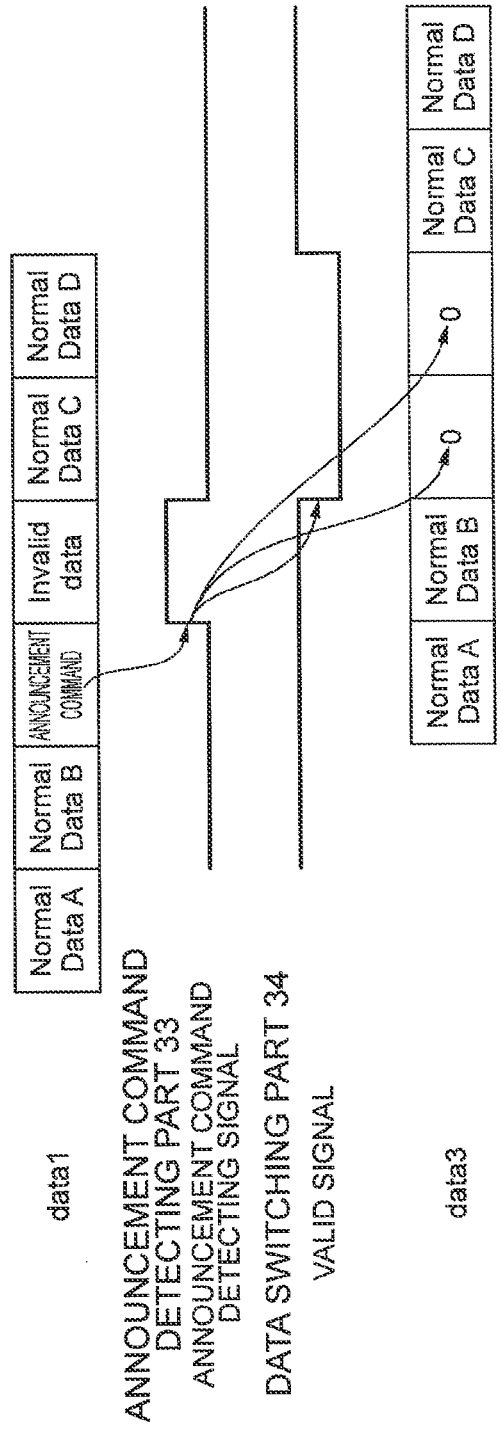
FIG. 22 is a timing chart of each piece of data in the receiving device 30 in Fourth embodiment.

FIG. 21 is a view showing a configuration of the receiving device 30 in Fourth embodiment. FIG. 22 is a timing chart of each piece of data in the receiving device 30 in Fourth embodiment. The receiving device 30 in Fourth embodiment includes a serial-parallel converting part 31 and a data processing part 32. The data processing part 32 includes an announcement command detecting part 33, a data switching part 34 and a decoding part 35.

The serial-parallel converting part 31 receives the serial data (serial data 0) and the clock (serial clock 0) that are transmitted from the transmitting device 10D in sync with each other. The serial-parallel converting part 31 includes a clock receiving part that receives the clock (serial clock 0) and the data receiving part that samples and receives the serial data (serial data 0) in sync with this clock. The serial-parallel converting part 31 also outputs the parallel data 1 converted from the serial data (serial data 0) to the announcement command detecting part 33.

The announcement command detecting part 33 receives the data 1 output from the serial-parallel converting part 31 and detects the phase shift announcement command in the data 1. Then, when detecting the phase shift announcement command, the announcement command detecting part 33 outputs an announcement command detecting signal that indicates the detection to the data switching part 34. The announcement command detecting part 33 also outputs the input data 1 as data 2 to the data switching part 34.

The data switching part 34 receives the data 2 and the announcement command detecting signal, which are output from the announcement command detecting part 33. Then, the data switching part 34 recognizes that data following the phase shift announcement command in the data 2 is the dummy data, that is, invalid data (Invalid data) on the basis of the announcement command detecting signal. Then, the data switching part 34 outputs a Valid signal as Low level to the decoding part 35 for an originally unnecessary period of the phase shift announcement command and the invalid data (Invalid data). The Valid signal given from the data switching part 34 to the decoding part 35 is put into High level when data 3 given from the data switching part 34 to the decoding part 35 is original data (Normal Data), and is put into Low level when the data 3 is invalid data. When the phase shift announcement command and the invalid data (Invalid data) cause a trouble in a subsequent stage, the data switching part 34 replaces the data with a value that generates no trouble (for example, zero) and outputs the data 3 after replacement to the decoding part 35.

The decoding part 35 receives the data 3 and the Valid signal output from the data switching part 34, performs required processing on the basis of them and outputs data 4 to a subsequent stage. In this manner, when the received data is the phase shift announcement command, the data processing part 32 including the announcement command detecting part 33, the data switching part 34 and the decoding part 35 can invalidate data reception at the timing announced by the phase shift announcement command.

Figure 23:
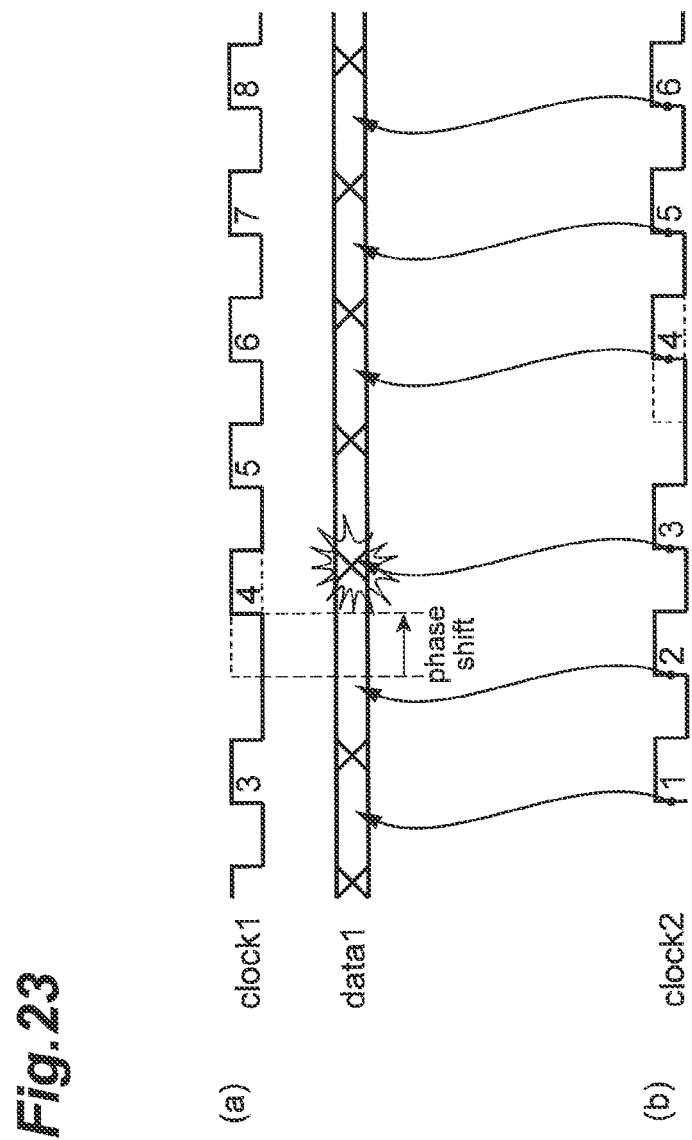
FIG. 23 is a timing chart of data and clock in a transmitting/receiving system having the transmitting device 10D and the receiving device 30 in Fourth embodiment.

FIG. 23 is a timing chart of data and clock in a transmitting/receiving system including the transmitting device 10D and the receiving device 30 in Fourth embodiment. At the time when the transmitting device 10D transmits the data 1 and the clock 1, the data 1 is synchronized with the clock 1, and when the clock 1 is phase-shifted, the data 1 is also phase-shifted by the same shift amount.

At the time when the receiving device 30 receives the data 1 and the clock 2, a delay time difference is generated between the data 1 and the clock 2, and in this figure, the delay time difference corresponds to two cycles of the clock. In this case, in the receiving device 30, even when the data 1 is sampled at an edge of a pulse #3 immediately before phase shift, the sampling is incorrect.

In Fourth embodiment, the phase shift announcement command that announces the phase shift timing when the clock is phase-shifted is transmitted from the transmitting device 10D to the receiving device 30. Then, in the receiving device 30, when the received data is the phase shift announcement command, data reception at the timing announced by the phase shift announcement command is made invalid. At this time, by setting the data to be made invalid to the dummy data, data transmission can be performed from the transmitting device 10D to the receiving device 30 without any problem.

Figure 24:
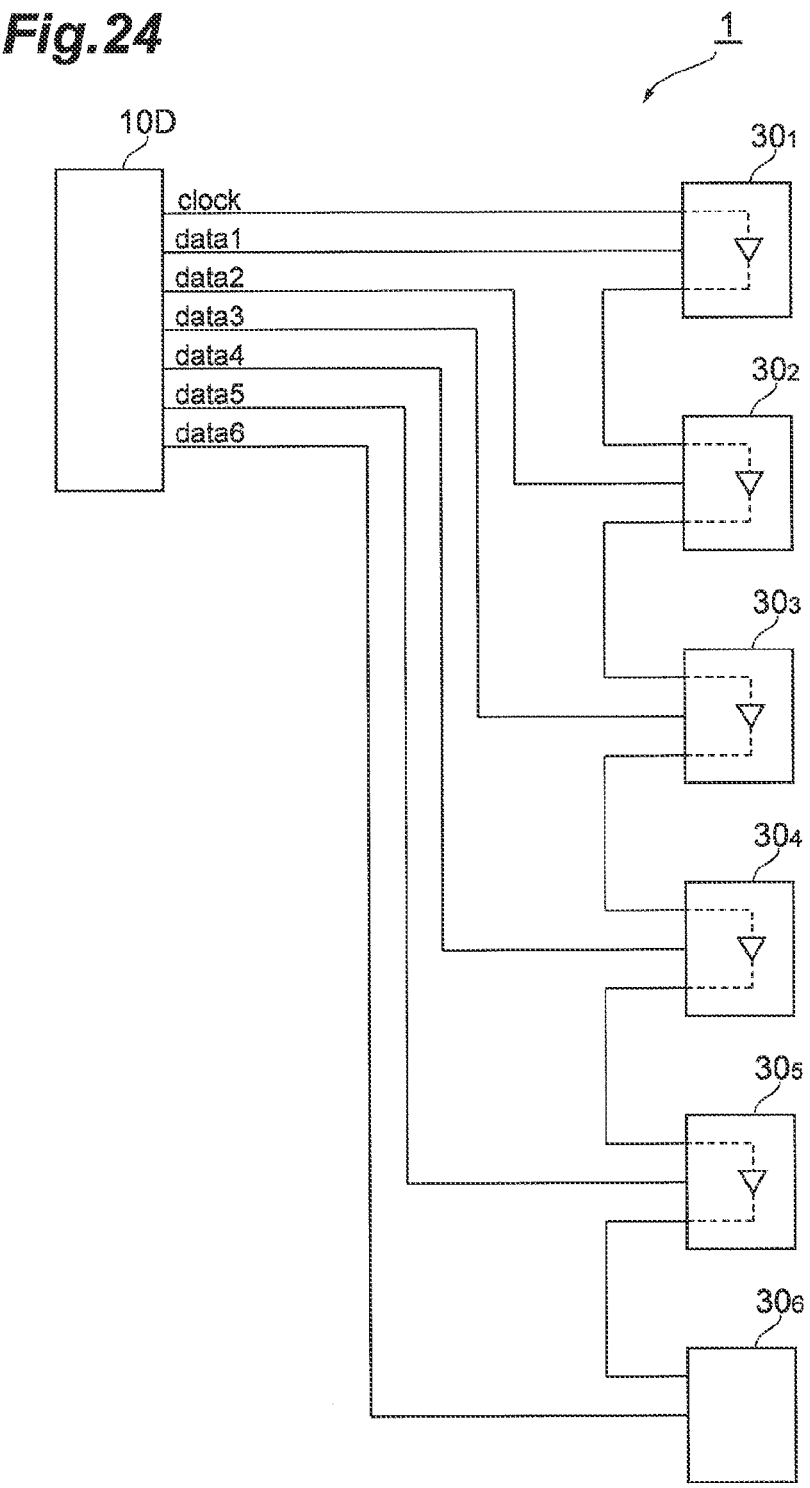
FIG. 24 is a view showing a configuration example of a transmitting/receiving system 1 in Fourth embodiment.

A specific operational example of a transmitting/receiving system 1 including the transmitting device 10D and the receiving device 30 in Fourth embodiment will be described with reference to FIG. 24 and FIGS. 25A to 25G. FIG. 24 is a view showing a configuration example of the transmitting/receiving system 1 in Fourth embodiment. The transmitting/receiving system 1 shown in this figure includes a transmitting device 10D and receiving devices $30_1$ to $30_6$.

Although the transmitting device 10D is substantially similar to the above-mentioned transmitting device 10D, the former transmitting device 10D transmits a common clock to the six receiving devices $30_1$ to $30_6$, transmits data 1 to the receiving device $30_1$, transmits data 2 to the receiving device $30_2$, transmits data 3 to the receiving device $30_3$, transmits data 4 to the receiving device $30_4$, transmits data 5 to the receiving device $30_5$ and transmits data 6 to the receiving device $30_6$.

Although each of the receiving devices $30_1$ to $30_6$ is substantially similar to the receiving device 30, the receiving devices $30_1$ to $30_6$ buffer the input clock and transmits the clock to the receiving device in the next stage. That is, the receiving device $30_1$ receives the data 1 and the clock, which are output from the transmitting device 10D, buffers the input clock and transmits the clock to the receiving device $30_2$ in the next stage. The receiving device $30_2$ receives the data 2 output from the transmitting device 10D and the clock output from the receiving device $30_1$ in the previous stage, buffers the input clock and transmits the clock to the receiving device $30_3$ in the next stage.

The receiving device $30_3$ receives the data 3 output from the transmitting device 10D and the clock output from the receiving device $30_2$ in the previous stage, buffers the input clock and transmits the clock to the receiving device $30_4$ in the next stage. The receiving device $30_4$ receives the data 4 output from the transmitting device 10D and the clock output from the receiving device $30_3$ in the previous stage, buffers the input clock and transmits the clock to the receiving device $30_5$ in the next stage.

The receiving device $30_5$ receives the data 5 output from the transmitting device 10D and the clock output from the receiving device $30_4$ in the previous stage, buffers the input clock and transmits the clock to the receiving device $30_6$ in the next stage. The receiving device $30_6$ receives the data 6 output from the transmitting device 10D and the clock output from the receiving device $30_5$ in the previous stage.

In the transmitting/receiving system 1 thus configured, the delay time differences between the data and the clock, which are input to each of the receiving devices $30_1$ to $30_6$ are different from one another. That is, the receiving device in the latter stage has a larger delay time difference. Even when no delay time difference exists between the data 1 and the clock, which are input to the receiving device $30_1$ in the first stage, a delay time difference exists between the data 2 and the clock, which are input to the receiving device $30_2$ in the second stage, and a larger delay time difference exists between the data 3 and the clock, which are input to the receiving device $30_3$ in the third stage.

FIGS. 25A to 25G are time charts of the data and the clock in the transmitting/receiving system 1 in Fourth embodiment. Here, it is assumed that the transmitting device 10D transmits 5 bits of dummy data f to j following 5 bits of phase shift announcement commands a to e. Further, it is assumed that phase shift occurs in the phase shift announcement command e. Each of the receiving devices $30_1$ to $30_6$ samples data at timings both at rising and falling of the clock.

FIG. 25A shows timing in a case of no phase shift and no delay time difference between the data and the clock. FIGS. 25B to 25G show timings of the data and the clock, which are input to each receiving device $30_n$, and the data sampled by each receiving device $30_n$, when phase shift is performed.

In an example shown in FIG. 25B, there is no delay time difference between the data 1 and the clock, which are input to the receiving device $30_1$ in the first stage. The clock and the data 1 are phase-shifted at the same timing and a period of the phase shift announcement command e is long. Accordingly, in the receiving device $30_1$, since the first received data is the phase shift announcement commands a to e, the following data f to j can be recognized as the dummy data.

In an example shown in FIG. 25C, a delay time difference of a half cycle of the clock (1 bit of data) exists between the data 2 and the clock, which are input to the receiving device $30_2$ in the second stage. Also in this case, in the receiving device $30_2$, since the first received data is the phase shift announcement commands a to e, the following data f to j can be recognized as the dummy data In an example shown in FIG. 25D, a delay time difference of one cycle of the clock (2 bits of data) exists between the data 3 and the clock, which are input to the receiving device $30_3$ in the third stage. In an example shown in FIG. 25E, a delay time difference of one and a half cycles of the clock (3 bits of data) exists between the data 4 and the clock, which are input to the receiving device $30_4$ in the fourth stage. In an example shown in FIG. 25F, a delay time difference of two cycles of the clock (4 bits of data) exists between the data 5 and the clock, which are input to the receiving device $30_6$ in the fifth stage. In an example shown in FIG. 25G, a delay time difference of two and a half cycles of the clock (5 bits of data) exists between the data 6 and the clock, which are input to the receiving device $30_6$ in the fifth stage.

In examples shown in FIGS. 25D to 25G, although each of the receiving devices $30_3$ to $30_6$ receives the phase shift announcement commands a to e, the subsequently received data is not necessarily the dummy data f to j and any dummy data is lost. The dummy data f is lost in the receiving device $30_3$, the dummy data g is lost in the receiving device $30_4$, the dummy data h is lost in the receiving device $30_5$ and the dummy data i is lost in the receiving device $30_6$.

However, the data e is received immediately after reception of the phase shift announcement commands a to e, and 5 bits of dummy data including the data e is received. Accordingly, in any of FIGS. 25B to 25G, the 5 bits of data received after reception of the 5 bits of phase shift announcement commands a to e may be recognized as the dummy data.

Although one piece of dummy data after the phase shift announcement command is shown in the above-mentioned example, by providing plural pieces of dummy data, a larger delay time difference between clock and data can be addressed.

The configuration shown in FIG. 24 or FIGS. 25A to 25G may be used in data transmission between a timing controller and a driver in image display devices such as liquid crystal displays (LCD) and plasma display panels (PDP), and data transmission in a memory system. By adopting such configuration, the number of communication cables in the above-mentioned image display devices and clock lines in the memory system can be reduced, contributing to reduction of costs and EMI.

INDUSTRIAL APPLICABILITY

EMI noise can be reduced while suppressing an increase in a circuit size.

REFERENCE SIGNS LIST 10,10A to 10D: transmitting device
11: transmission data generating part
12,12A to 12C: output buffer part
13: data transmitting part
14,14A to 14C: clock transmitting part
15: PLL
16: counter
17: clock inverting part
18: clock selecting part
21: transmission data generating part
22: announcement command generating part
23: parallel-serial converting part
30: receiving device
31: serial-parallel converting part
32: data processing part
33: announcement command detecting part
34: data switching part
35: decoding part

The invention claimed is:
1. A transmitting device comprising:
a clock transmitting part that generates and transmits a clock intermittently phase-shifted according to one of a first predetermined time interval spanning at least two pulses of the clock and a second predetermined time interval spanning at least three pulses of the clock; and
a data transmitting part that transmits data in sync with the clock transmitted from the clock transmitting part.

2. The transmitting device according to claim 1, wherein the clock transmitting part generates the phase-shifted clock by switching a clock selected from among multi-phase clocks and transmits the clock.

3. The transmitting device according to claim 1, wherein the clock transmitting part phase-shifts the clock at a transmission timing of a specified piece of data among pieces of data transmitted from the data transmitting part and transmits the clock.

4. The transmitting device according to claim 1, wherein when the clock transmitted from the clock transmitting part is phase-shifted, the data transmitting part transmits a phase shift announcement command that announces the phase shift timing.

5. The transmitting device according to claim 4, wherein immediately before the clock transmitted from the clock transmitting part is phase-shifted, the data transmitting part transmits the phase shift announcement command.

6. The transmitting device according to claim 4, wherein the data transmitting part transmits dummy data following the phase shift announcement command.

7. A receiving device that receives a clock and data transmitted from a transmitting device in sync with each other, comprising:
a clock receiving part that receives the clock which is intermittently phase-shifted according to one of a first predetermined time interval spanning at least two pulses of the clock and a second predetermined time interval spanning at least three pulses of the clock;
a data receiving part that samples and receives data in sync with the clock received by the clock receiving part; and
a data processing part that, when the data received by the data receiving part is a phase shift announcement command that announces a timing when each of the clock received by the clock receiving part and the data received by the data receiving part is phase-shifted, invalidates data reception by the data receiving part at the timing announced by the phase shift announcement command.

8. A transmitting/receiving system comprising:
a transmitting device comprising:
a clock transmitting part that generates and transmits a clock intermittently phase-shifted according to one of a first predetermined time interval spanning at least two pulses of the clock and a second predetermined time interval spanning at least three pulses of the clock; and
a data transmitting part that transmits data in sync with the clock transmitted from the clock transmitting part,
wherein when the clock transmitted from the clock transmitting part is phase-shifted, the data transmitting part transmits a phase shift announcement command that announces the phase shift timing; and
the receiving device according to claim 7, wherein
the clock receiving part of the receiving device receives the clock transmitted from the clock transmitting part of the transmitting device;
the data receiving part of the receiving device receives the data transmitted from the data transmitting part of the transmitting device; and
when the data that is transmitted from the data transmitting part of the transmitting device and received by the data receiving part of the receiving device is the phase shift announcement command, the data processing part of the receiving device invalidates data reception by the data receiving part at a timing announced by the phase shift announcement command.

9. The transmitting device according to claim 5, wherein the data transmitting part transmits dummy data following the phase shift announcement command.

10. A transmitting/receiving system comprising:
a transmitting device comprising:
a clock transmitting part that generates and transmits a clock intermittently phase-shifted according to one of a first predetermined time interval spanning at least two pulses of the clock and a second predetermined time interval spanning at least three pulses of the clock; and
a data transmitting part that transmits data in sync with the clock transmitted from the clock transmitting part,
wherein when the clock transmitted from the clock transmitting part is phase-shifted, the data transmitting part transmits a phase shift announcement command that announces the phase shift timing, and
wherein immediately before the clock transmitted from the clock transmitting part is phase-shifted, the data transmitting part transmits the phase shift announcement command; and
the receiving device according to claim 7, wherein
the clock receiving part of the receiving device receives the clock transmitted from the clock transmitting part of the transmitting device;
the data receiving part of the receiving device receives the data transmitted from the data transmitting part of the transmitting device; and
when the data that is transmitted from the data transmitting part of the transmitting device and received by the data receiving part of the receiving device is the phase shift announcement command, the data processing part of the receiving device invalidates data reception by the data receiving part at a timing announced by the phase shift announcement command.

11. A transmitting/receiving system comprising:
a transmitting device comprising:
a clock transmitting part that generates and transmits a clock intermittently phase-shifted according to one of a first predetermined time interval spanning at least two pulses of the clock and a second predetermined time interval spanning at least three pulses of the clock; and
a data transmitting part that transmits data in sync with the clock transmitted from the clock transmitting part,
wherein when the clock transmitted from the clock transmitting part is phase-shifted, the data transmitting part transmits a phase shift announcement command that announces the phase shift timing, and
wherein the data transmitting part transmits dummy data following the phase shift announcement command; and
the receiving device according to claim 7, wherein
the clock receiving part of the receiving device receives the clock transmitted from the clock transmitting part of the transmitting device;

the data receiving part of the receiving device receives the data transmitted from the data transmitting part of the transmitting device; and when the data that is transmitted from the data transmitting part of the transmitting device and received by the data receiving part of the receiving device is the phase shift announcement command, the data processing part of the receiving device invalidates data reception by the data receiving part at a timing announced by the phase shift announcement command.

12. A transmitting/receiving system comprising:

a transmitting device comprising:

a clock transmitting part that generates and transmits a clock intermittently phase-shifted according to one of a first predetermined time interval spanning at least two pulses of the clock and a second predetermined time interval spanning at least three pulses of the clock; and a data transmitting part that transmits data in sync with the clock transmitted from the clock transmitting part, wherein when the clock transmitted from the clock transmitting part is phase-shifted, the data transmitting part transmits a phase shift announcement command that announces the phase shift timing, wherein immediately before the clock transmitted from the clock transmitting part is phase-shifted, the data transmitting part transmits the phase shift announcement command, and wherein the data transmitting part transmits dummy data following the phase shift announcement command; and the receiving device according to claim 7, wherein the clock receiving part of the receiving device receives the clock transmitted from the clock transmitting part of the transmitting device;

the data receiving part of the receiving device receives the data transmitted from the data transmitting part of the transmitting device; and when the data that is transmitted from the data transmitting part of the transmitting device and received by the data receiving part of the receiving device is the phase shift announcement command, the data processing part of the receiving device invalidates data reception by the data receiving part at a timing announced by the phase shift announcement command.

13. The transmitting device according to claim 1, wherein the intermittent phase-shift is 180 degrees.

14. The transmitting device according to claim 13, wherein the clock is alternately intermittently phase-shifted according to the first predetermined time interval and the second predetermined time interval.

* * * * *